United States Patent
Xu et al.

(10) Patent No.: US 9,924,497 B2
(45) Date of Patent: Mar. 20, 2018

(54) METHOD FOR TRANSMITTING SIGNAL IN DEVICE-TO-DEVICE PROXIMITY SERVICE, BASE STATION, AND USER EQUIPMENT

(71) Applicant: Huawei Technologies Co., Ltd., Shenzhen (CN)

(72) Inventors: Kai Xu, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 14/901,011

(22) PCT Filed: May 26, 2014

(86) PCT No.: PCT/CN2014/078415
§ 371 (c)(1),
(2) Date: Dec. 22, 2015

(87) PCT Pub. No.: WO2015/180017
PCT Pub. Date: Dec. 3, 2015

(65) Prior Publication Data
US 2016/0150503 A1    May 26, 2016

(51) Int. Cl.
*H04W 4/00*  (2009.01)
*H04W 72/04*  (2009.01)
*H04W 72/08*  (2009.01)

(52) U.S. Cl.
CPC ......... *H04W 72/04* (2013.01); *H04W 72/082* (2013.01)

(58) Field of Classification Search
None
See application file for complete search history.

(56) References Cited

U.S. PATENT DOCUMENTS

2013/0223318 A1  8/2013  Liu et al.
2013/0223353 A1  8/2013  Liu et al.
(Continued)

FOREIGN PATENT DOCUMENTS

| CN | 103002578 A | 3/2013 |
| CN | 103442442 A | 12/2013 |
| CN | 103517343 A | 1/2014 |
| WO | 2012159270 A1 | 11/2012 |

OTHER PUBLICATIONS

"Resource assignment for D2D communication," 3GPP TSG RAN WG1 Meeting #74bis, Guangzhou, China, R1-134073, 3rd Generation Partnership Project, Valbonne, France (Oct. 7-11, 2013).
(Continued)

*Primary Examiner* — Lonnie Sweet
(74) *Attorney, Agent, or Firm* — Leydig, Voit & Mayer, Ltd.

(57) ABSTRACT

Embodiments of the present invention provide a method for transmitting a signal in a device-to-device proximity service D2D ProSe, a base station, and a user equipment, where the method includes: allocating, by a base station, at least one time-frequency resource set to each user cluster in N user clusters in a cell covered by the base station, where at least two time-frequency resource sets in M time-frequency resource sets allocated by the base station to the N user clusters are different; and transmitting, by the base station, $R^{th}$ information to the $R^{th}$ user cluster in the N user clusters, where the $R^{th}$ information is used to indicate an $R^{th}$ time-frequency resource set that is allocated by the base station to the $R^{th}$ user cluster and used for transmitting a signal, where a value of R is 1, . . . , N separately.

8 Claims, 6 Drawing Sheets

(56) References Cited

U.S. PATENT DOCUMENTS

| | | | |
|---|---|---|---|
| 2013/0225184 A1 | 8/2013 | Liu et al. | |
| 2013/0288608 A1* | 10/2013 | Fwu | H04W 72/02 455/63.1 |
| 2015/0141000 A1* | 5/2015 | Yilmaz | H04W 76/023 455/426.1 |
| 2015/0319745 A1* | 11/2015 | Seo | H04W 72/0406 370/329 |
| 2015/0351076 A1* | 12/2015 | Pais | H04W 72/005 370/312 |
| 2016/0174101 A1* | 6/2016 | Duval et al. | H04W 8/005 455/522 |
| 2016/0315726 A1* | 10/2016 | Sandberg | H04W 72/121 |
| 2016/0374068 A1* | 12/2016 | Kim | H04W 72/04 |

OTHER PUBLICATIONS

"Resource Allocation and Interference Coordination in D2D Communications," 3GPP TSG RAN WG1 Meeting #74bis, Guangzhou, China, R1-134412, $3^{rd}$ Generation Partnership Project, Valbonne, France (Oct. 7-11, 2013).

"Integrated resource scheduling for in-coverage D2D communication to support Mode 1 and Mode 2," 3GPP TSG RAN WG1 Meeting #76bis, Shenzhen, China, R1-141499, $3^{rd}$ Generation Partnership Project, Valbonne, France (Mar. 31- Apr. 4, 2014).

"ProSe direct communication (D2D)," 3GPP TSG-RAN WG1 Meeting #73, Fukuoka, Japan, R1-132174, $3^{rd}$ Generation Partnership Project, Valbonne, France (May 20-24, 2013).

"Radio resource sharing between Public Safety groups using D2D," 3GPP TSG RAN WG1 Meeting #76, Prague, Czech Republic, R1-140516, $3^{rd}$ Generation Partnership Project, Valbonne, France (Feb. 10-14, 2014).

"Discussion on Resource Allocation in D2D Communications," 3GPP TSG RAN WG1 Meeting #75, San Francisco, USA, R1-135481, $3^{rd}$ Generation Partnership Project, Valbonne, France, (Nov. 11-15, 2013).

"On the Resource Pool Configuration of D2D Communications," 3GPP TSG RAN WG1 Meeting #76, Prague, Czech Republic, R1-140332, $3^{rd}$ Generation Partnership Project, Valbonne, France, (Feb. 10-14, 2014).

* cited by examiner

100

A base station allocates at least one time-frequency resource set to each user cluster in N user clusters in a cell covered by the base station, where at least two time-frequency resource sets in M time-frequency resource sets allocated by the base station to the N user clusters are different, where N is an integer not less than 2, and M is an integer not less than N ∼ S110

The base station transmits $R^{th}$ information to the $R^{th}$ user cluster in the N user clusters, where the $R^{th}$ information is used to indicate an $R^{th}$ time-frequency resource set that is allocated by the base station to the $R^{th}$ user cluster and used for transmitting a signal, where a value of R is 1, 2,..., N separately ∼ S120

FIG. 2

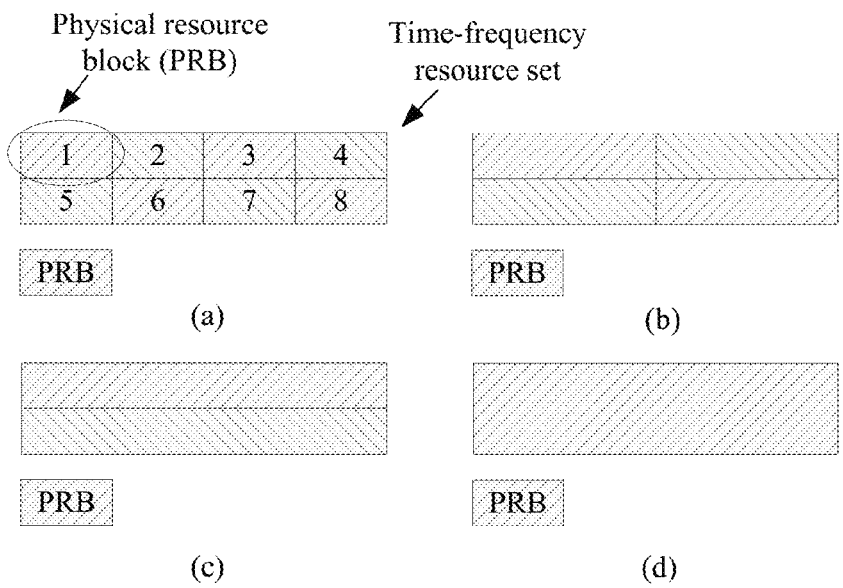

```
A first user equipment (UE) receives a first message sent by a base
station, where the first message is used to indicate a first time-
frequency resource set allocated to a first user cluster to which the
first UE belongs, and the first time-frequency resource set is
different from a second time-frequency resource set allocated by
the base station to at least one another user cluster in a cell
covered by the base station
```
～ S210

```
The first UE sends a signal to a second UE according to the first
time-frequency resource set, where the second UE belongs to the
first user cluster
```
～ S220

```
A second user equipment (UE) receives a first message sent by a
base station, where the first message is used to indicate a first
time-frequency resource set allocated to a first user cluster to
which the second UE belongs, and the first time-frequency
resource set is different from a second time-frequency resource set
allocated by the base station to at least one another user cluster in
a cell covered by the base station
```
～ S310

```
The second UE detects, according to the first time-frequency
resource set, a signal sent by a first UE, where the first UE belongs
to the first user cluster
```
～ S320

FIG. 5

METHOD FOR TRANSMITTING SIGNAL IN DEVICE-TO-DEVICE PROXIMITY SERVICE, BASE STATION, AND USER EQUIPMENT

This application is a national stage application of International Application No. PCT/CN2014/078415, filed May 26, 2014, which is hereby incorporated by reference in its entirety.

TECHNICAL FIELD

Embodiments of the present invention relate to the field of communications, and in particular, to a method for transmitting a signal in a device-to-device proximity service, a base station, and a user equipment.

BACKGROUND

A device-to-device proximity service (English full name: Device to Device Proximity Service, English abbreviations: D2D ProSe) between user equipments (English full name: User Equipment, English abbreviations: UE) has become a hot topic for a Long Term Evolution (English full name: Long Term Evolution, English abbreviations: LTE) system.

Currently, there is still no perfect solution to transmitting a signal in the D2D ProSe. A possible case is that a conventional LTE mode is directly used, that is, using a dynamic scheduling mode to transmit a signal, for example, a discovery signal, on a fixed segment of time-frequency resources. However, in coverage of a macro cell, when a quantity of user equipments is relatively large, multiple user equipments need to be scheduled, so as to allocate time-frequency resources, and it is likely that real-time scheduling cannot be performed, which may cause some user equipments to wait for an excessively long time.

SUMMARY

Embodiments of the present invention provide a method for transmitting a signal in a device-to-device proximity service (D2D ProSe), a base station, and a user equipment, which can avoid resource contention between different user clusters, and effectively reduce a waiting time required for using a time-frequency resource by the user equipment.

A first aspect provides a method for transmitting a signal in a device-to-device proximity service is provided, where the method includes: allocating, by a base station, at least one time-frequency resource set to each user cluster in N user clusters in a cell covered by the base station, where at least two time-frequency resource sets in M time-frequency resource sets allocated by the base station to the N user clusters are different, where N is an integer not less than 2, and M is an integer not less than N; and transmitting, by the base station, $R^{th}$ information to the $R^{th}$ user cluster in the N user clusters, where the $R^{th}$ information is used to indicate an $R^{th}$ time-frequency resource set that is allocated by the base station to the $R^{th}$ user cluster and used for transmitting a signal, where a value of R is 1, 2, . . . , N separately.

With reference to the first aspect, in a first possible implementation manner of the first aspect, any two time-frequency resource sets in the M time-frequency resource sets of the N user clusters have no intersection set.

With reference to the first aspect, in a second possible implementation manner of the first aspect, the allocating, by a base station, at least one time-frequency resource set to each user cluster in N user clusters in a cell covered by the base station includes: allocating, by the base station, the at least one time-frequency resource set to each user cluster in the N user clusters according to information about interference between the N user clusters.

With reference to the second possible implementation manner of the first aspect, in a third possible implementation manner of the first aspect, the allocating, by the base station, the at least one time-frequency resource set to each user cluster in the N user clusters according to information about interference between the N user clusters includes: when it is determined that interference between the $i^{th}$ user cluster and the $j^{th}$ user cluster in the N user clusters is greater than or equal to a first threshold, allocating an $i_1^{th}$ time-frequency resource set to the $i^{th}$ user cluster, and allocating a j time-frequency resource set to the $j^{th}$ user cluster, where the $i_1^{th}$ time-frequency resource set and the $j_1^{th}$ time-frequency resource set have no intersection set; or when it is determined that interference between the $i^{th}$ user cluster and the $j^{th}$ user cluster is less than or equal to a second threshold, allocating an $i_2^{th}$ time-frequency resource set to the $i^{th}$ user cluster, and allocating a $j_2^{th}$ time-frequency resource set to the $j^{th}$ user cluster, where the $i_2^{th}$ time-frequency resource set and the $j_2^{th}$ time-frequency resource set have an intersection set; where the second threshold is not greater than the first threshold, i is any integer from 1 to N, and j is any integer, except i, from 1 to N.

With reference to the first aspect and any possible implementation manner of the first to the third possible implementation manners of the first aspect, in a fourth possible implementation manner of the first aspect, the M time-frequency resource sets of the N user clusters are all physical resource block (PRB) time-frequency resource sets.

With reference to the fourth possible implementation manner of the first aspect, in a fifth possible implementation manner of the first aspect, the method further includes: receiving, by the base station, a first message that is sent by a first user equipment in the $R^{th}$ user cluster and that carries a resource level of P, where the first message is used to indicate that the first UE uses the $(1+P\times k)^{th}$ to the $(P\times(k+1))^{th}$ PRBs of the $R^{th}$ time-frequency resource set to send a signal to a second user equipment in the $R^{th}$ user cluster, where P is a positive integer not greater than Q, a value range of k is a non-negative integer less than a rounded number of (Q/P), and Q is a quantity of PRBs included in the first time-frequency resource set; and sending, by the base station, according to the first message, a second message that carries the resource level of P to the second user equipment, so that the second user equipment uses the second message when detecting, on the $R^{th}$ time-frequency resource set, the signal sent by the first user equipment.

With reference to the fifth possible implementation manner of the first aspect, in a sixth possible implementation manner of the first aspect, before the base station receives the first message, the method further includes: transmitting, by the base station, third information to the $R^{th}$ user cluster, where the third information is used to instruct to use the $(1+P\times k)^{th}$ to the $(P\times(k+1))^{th}$ PRBs of the $R^{th}$ time-frequency resource set to send the signal, where a value range of P is a positive integer not greater than Q, and a value range of k is a non-negative integer less than the rounded number of (Q/P).

With reference to the first aspect and any possible implementation manner of the first to the sixth possible implementation manners of the first aspect, in a seventh possible implementation manner of the first aspect, the $R^{th}$ information includes a correspondence between a user identifier of the $R^{th}$ user cluster and the $R^{th}$ time-frequency resource set.

A second aspect provides a method for transmitting a signal in a device-to-device proximity service is provided, where the method includes: receiving, by a first user equipment, a first message sent by a base station, where the first message is used to indicate a first time-frequency resource set allocated to a first user cluster to which the first user equipment belongs, and the first time-frequency resource set is different from a second time-frequency resource set allocated by the base station to at least one another user cluster in a cell covered by the base station; and sending, by the first user equipment, a signal to a second user equipment according to the first time-frequency resource set, where the second user equipment belongs to the first user cluster.

With reference to the second aspect, in a first possible implementation manner of the second aspect, interference between the first user cluster and the at least one another user cluster is greater than or equal to a first threshold.

With reference to the second aspect or the first possible implementation manner of the second aspect, in a second possible implementation manner of the second aspect, the first time-frequency resource set is a physical resource block (PRB) time-frequency resource set.

With reference to the second possible implementation manner of the second aspect, in a third possible implementation manner of the second aspect, the sending, by the first user equipment, a signal to a second user equipment according to the first time-frequency resource set includes: using, by the first user equipment, the $(1+P \times k)^{th}$ to the $(P \times (k+1))^{th}$ PRBs of the first time-frequency resource set to send the signal to the second user equipment, where P is a resource level and is a positive integer not greater than Q, k is a non-negative integer less than a rounded number of (Q/P), and Q is a quantity of PRBs included in the first time-frequency resource set.

With reference to the third possible implementation manner of the second aspect, in a fourth possible implementation manner of the second aspect, the method further includes: sending, by the first user equipment, a second message that carries the resource level of P to the base station, where the second message is used to trigger the base station to send a third message that carries the resource level of P to the second user equipment, so that the second user equipment uses the third message when detecting, on the first time-frequency resource set, the signal sent by the first user equipment.

With reference to the third or the fourth possible implementation manner of the second aspect, in a fifth possible implementation manner of the second aspect, before the sending, by the first user equipment, a signal to a second user equipment according to the first time-frequency resource set, the method further includes: receiving, by the first user equipment, a fourth message sent by the base station, where the fourth message is used to instruct to use the $(1+P \times k)^{th}$ to the $(P \times (k+1))^{th}$ PRBs of the first time-frequency resource set to send the signal, where a value range of P is a positive integer not greater than Q, and a value range of k is a non-negative integer less than the rounded number of (Q/P).

With reference to the second aspect and any possible implementation manner of the first to the fifth possible implementation manners of the second aspect, in a sixth possible implementation manner of the second aspect, the first message includes a correspondence between a user identifier of the first user cluster and the first time-frequency resource set; and the sending, by the first user equipment, a signal to a second user equipment according to the first time-frequency resource set includes: determining, by the first user equipment, the first time-frequency resource set according to the correspondence; and sending, by the first user equipment, the signal to the second user equipment according to the first time-frequency resource set.

A third aspect provides a method for transmitting a signal in a device-to-device proximity service is provided, where the method includes: receiving, by a second user equipment, a first message sent by a base station, where the first message is used to indicate a first time-frequency resource set allocated to a first user cluster to which the second user equipment belongs, and the first time-frequency resource set has no intersection set with a second time-frequency resource set allocated by the base station to at least one another user cluster in a cell covered by the base station; and detecting, by the second user equipment according to the first time-frequency resource set, a signal sent by a first user equipment, where the first user equipment belongs to the first user cluster.

With reference to the third aspect, in a first possible implementation manner of the third aspect, interference between the $R^{th}$ user cluster and the at least one another user cluster is greater than or equal to a first threshold.

With reference to the third aspect or the first possible implementation manner of the third aspect, in a second possible implementation manner of the third aspect, the first time-frequency resource set is a physical resource block (PRB) time-frequency resource set.

With reference to the second possible implementation manner of the third aspect, in a third possible implementation manner of the third aspect, the method further includes: receiving, by the second user equipment, a second message sent by the base station, where the second message is used to instruct to detect the signal on the $(1+P \times k)^{th}$ to the $(P \times (k+1))^{th}$ PRBs of the first time-frequency resource set, where P is a resource level and is a positive integer not greater than Q, a value range of k is a non-negative integer less than a rounded number of (Q/P), and Q is a quantity of PRBs included in the first time-frequency resource set; and the detecting, by the second user equipment according to the first time-frequency resource set, a signal sent by a first user equipment includes: successively performing, by the second user equipment, blind detection on the $(1+P \times k)^{th}$ to the $(P \times (k+1))^{th}$ PRBs of the first time-frequency resource set according to the second message until the signal is detected, where a value of k is 0, 1, . . . , L separately, and L is equal to a difference obtained by subtracting 1 from an integer part of (Q/P).

With reference to the second possible implementation manner of the third aspect, in a fourth possible implementation manner of the third aspect, the detecting, by the second user equipment according to the first time-frequency resource set, a signal sent by a first user equipment includes: successively performing, by the second user equipment, blind detection on the $(1+P \times k)^{th}$ to the $(P \times (k+1))^{th}$ PRBs of the first time-frequency resource set until the signal is detected, where a value of k is 0, 1, . . . , L separately, and L is equal to a difference obtained by subtracting 1 from an integer part of (Q/P), where a value of P is 1, 2, . . . , V separately, V is a difference obtained by subtracting 1 from Q, and Q is a quantity of PRBs included in the first time-frequency resource set.

With reference to the third aspect and any possible implementation manner of the first to the fourth possible implementation manners of the third aspect, in a fifth possible implementation manner of the third aspect, the first message includes a correspondence between a user identifier of the first user cluster and the first time-frequency resource set; and the detecting, by the second user equipment, according to the first time-frequency resource set, a signal sent by a first user equipment includes: determining, by the second user equipment, the first time-frequency resource set according to the correspondence; and detecting, by the second user equipment according to the first time-frequency resource set, the signal sent by the first user equipment.

A fourth aspect provides a base station, where the base station includes: an allocating module, configured to allocate at least one time-frequency resource set to each user cluster in N user clusters in a cell covered by the base station, where at least two time-frequency resource sets in M time-frequency resource sets allocated by the base station to the N user clusters are different, where N is an integer not less than 2, and M is an integer not less than N; and a transmitting module, configured to transmit $R^{th}$ information to the $R^{th}$ user cluster in the N user clusters, where the $R^{th}$ information is used to indicate an $R^{th}$ time-frequency resource set that is allocated by the base station to the $R^{th}$ user cluster and used for transmitting a signal, where a value of R is set to 1, 2, . . . , N separately.

With reference to the fourth aspect, in a first possible implementation manner of the fourth aspect, any two time-frequency resource sets in the M time-frequency resource sets allocated by the allocating module to the N user clusters have no intersection set.

With reference to the fourth aspect, in a second possible implementation manner of the fourth aspect, the at least one time-frequency resource set allocated by the allocating module to each user cluster in the N user clusters is determined according to information about interference between the N user clusters.

With reference to the second possible implementation manner of the fourth aspect, in a third possible implementation manner of the fourth aspect, the allocating module includes at least one of the following: a first allocating unit, configured to: when it is determined that interference between the $i^{th}$ user cluster and the $j^{th}$ user cluster in the N user clusters is greater than or equal to a first threshold, allocate an $i_1^{th}$ time-frequency resource set to the $i^{th}$ user cluster, and allocate a $j_1^{th}$ time-frequency resource set to the $j^{th}$ user cluster, where the $i_1^{th}$ time-frequency resource set and the $j_1^{th}$ time-frequency resource set have no intersection set; or a second allocating unit, configured to: when it is determined that interference between the $i^{th}$ user cluster and the $j^{th}$ user cluster is less than or equal to a second threshold, allocate an $i_2^{th}$ time-frequency resource set to the $i^{th}$ user cluster, and allocate a $j_2^{th}$ time-frequency resource set to the $j^{th}$ user cluster, where the $i_2^{th}$ time-frequency resource set and the $j_2^{th}$ time-frequency resource set have an intersection set; where the second threshold is not greater than the first threshold, i is any integer from 1 to N, and j is any integer, except i, from 1 to N.

With reference to the fourth aspect and any possible implementation manner of the first to the third possible implementation manners of the fourth aspect, in a fourth possible implementation manner of the fourth aspect, the M time-frequency resource sets allocated by the allocating module to the N user clusters are all physical resource block (PRB) time-frequency resource sets.

With reference to the fourth possible implementation manner of the fourth aspect, in a fifth possible implementation manner of the fourth aspect, the base station further includes: a receiving module, configured to receive a first message that is sent by a first user equipment in the $R^{th}$ user cluster and that carries a resource level of P, where the first message is used to indicate that the first user equipment uses the $(1+P\times k)^{th}$ to the $(P\times(k+1))^{th}$ PRBs of the first time-frequency resource set to send a signal to a second user equipment in the $R^{th}$ user cluster, where P is a positive integer not greater than Q, a value range of k is a non-negative integer less than a rounded number of (Q/P), and Q is a quantity of PRBs included in the $R^{th}$ time-frequency resource set; and the sending module, further configured to send, according to the first message, a second message that carries the resource level of P to the second user equipment, so that the second UE uses the second message when detecting, on the $R^{th}$ time-frequency resource set, the signal sent by the first user equipment.

With reference to the fifth possible implementation manner of the fourth aspect, in a sixth possible implementation manner of the fourth aspect, the sending module is further configured to: before the receiving module receives the first message, transmit third information to the $R^{th}$ user cluster, where the third information is used to instruct to use the $(1+P\times k)^{th}$ to the $(P\times(k+1))^{th}$ PRBs of the first time-frequency resource set to send the signal, where a value range of P is a positive integer not greater than Q, and a value range of k is a non-negative integer less than the rounded number of (Q/P).

With reference to the fourth aspect and any possible implementation manner of the first to the sixth possible implementation manners of the fourth aspect, in a seventh possible implementation manner of the fourth aspect, the $R^{th}$ information sent by the sending module includes a correspondence between a user identifier of the $R^{th}$ user cluster and the $R^{th}$ time-frequency resource set.

A fifth aspect provides a user equipment is provided, where the user equipment includes: a receiving module, configured to receive a first message sent by a base station, where the first message is used to indicate a first time-frequency resource set allocated to a first user cluster to which the user equipment belongs, and the first time-frequency resource set is different from a second time-frequency resource set allocated by the base station to at least one another user cluster in a cell covered by the base station; and a sending module, configured to send a signal to a second user equipment according to the first time-frequency resource set received by the receiving module, where the second user equipment belongs to the first user cluster.

With reference to the fifth aspect, in a first possible implementation manner of the fifth aspect, interference between the first user cluster and the at least one another user cluster is greater than or equal to a first threshold.

With reference to the fifth aspect or the first possible implementation manner of the fifth aspect, in a second possible implementation manner of the fifth aspect, the first time-frequency resource set received by the receiving module is a physical resource block (PRB) time-frequency resource set.

With reference to the second possible implementation manner of the fifth aspect, in a third possible implementation manner of the fifth aspect, the sending module is specifically configured to use the $(1+P\times k)^{th}$ to the $(P\times(k+1))^{th}$ PRBs of the first time-frequency resource set to send the signal to the second user equipment, where P is a resource level and is a positive integer not greater than Q, k is a non-negative integer less than a rounded number of (Q/P), and Q is a quantity of PRBs included in the first time-frequency resource set.

With reference to the third possible implementation manner of the fifth aspect, in a fourth possible implementation manner of the fifth aspect, the sending module is further configured to send a second message that carries the resource level of P to the base station, where the second message is used to trigger the base station to send a third message that carries the resource level of P to the second user equipment, so that the second user equipment uses the third message when detecting, on the first time-frequency resource set, the signal sent by the user equipment.

With reference to the third or the fourth possible implementation manner of the fifth aspect, in a fifth possible implementation manner of the fifth aspect, the receiving module is further configured to: before the sending module sends the signal to the second user equipment, receive a fourth message sent by the base station, where the fourth message is used to instruct to use the $(1+P\times k)^{th}$ to the $(P\times(k+1))^{th}$ PRBs of the first time-frequency resource set to send the signal, where a value range of P is a positive integer not greater than Q, and a value range of k is a non-negative integer less than the rounded number of (Q/P).

With reference to the fifth aspect and any possible implementation manner of the first to the fifth possible implementation manners of the fifth aspect, in a sixth possible implementation manner of the fifth aspect, the first message received by the receiving module includes a correspondence between a user identifier of the first user cluster and the first time-frequency resource set; and the sending module includes: a determining unit, configured to determine the first time-frequency resource set according to the correspondence received by the receiving module; and a sending unit, configured to send the signal to the second user equipment according to the first time-frequency resource set determined by the determining unit.

A sixth aspect provides a user equipment, where the user equipment includes: a receiving module, configured to receive a first message sent by a base station, where the first message is used to indicate a first time-frequency resource set allocated to a first user cluster to which the user equipment belongs, and the first time-frequency resource set is different from a second time-frequency resource set allocated by the base station to at least one another user cluster in a cell covered by the base station; and a detecting module, configured to detect, according to the first time-frequency resource set received by the receiving module, a signal sent by a first user equipment, where the first user equipment belongs to the first user cluster.

With reference to the sixth aspect, in a first possible implementation manner of the sixth aspect, interference between the first user cluster and the at least one another user cluster is greater than or equal to a first threshold.

With reference to the sixth aspect or the first possible implementation manner of the sixth aspect, in a second possible implementation manner of the sixth aspect, the first time-frequency resource set received by the receiving module is a physical resource block (PRB) time-frequency resource set.

With reference to the second possible implementation manner of the sixth aspect, in a third possible implementation manner of the sixth aspect, the receiving module is further configured to receive a second message sent by the base station, where the second message is used to indicate that the signal is detected on the $(1+P\times k)^{th}$ to the $(P\times(k+1))^{th}$ PRBs of the first time-frequency resource set, where P is a resource level and is a positive integer not greater than Q, a value range of k is a non-negative integer less than a round number part of (Q/P), and Q is a quantity of PRBs included in the first time-frequency resource set; and the detecting module is specifically configured to successively perform, according to the second message, blind detection on the $(1+P\times k)^{th}$ to the $(P\times(k+1))^{th}$ PRBs of the first time-frequency resource set until the signal is detected, where a value of k is 0, 1, . . . , L separately, and L is a difference obtained by subtracting 1 from an integer part of (Q/P).

With reference to the second possible implementation manner of the sixth aspect, in a fourth possible implementation manner of the sixth aspect, the detecting module is specifically configured to successively perform blind detection on the $(1+P\times k)^{th}$ to the $(P\times(k+1))^{th}$ PRBs of the first time-frequency resource set until the signal is detected, where a value of k is 0, 1, . . . , L separately, and L is equal to a difference obtained by subtracting 1 from an integer part of (Q/P), where a value of P is 1, 2, . . . , V separately, V is a difference obtained by subtracting 1 from Q, and Q is a quantity of PRBs included in the first time-frequency resource set.

With reference to the sixth aspect and any possible implementation manner of the first to the fourth possible implementation manners of the sixth aspect, in a fifth possible implementation manner of the sixth aspect, the first message received by the receiving module includes a correspondence between a user identifier of the first user cluster and the first time-frequency resource set; and the detecting module includes: a determining unit, configured to determine the first time-frequency resource set according to the correspondence; and a detecting unit, configured to detect, according to the first time-frequency resource set, the signal sent by the first user equipment.

In conclusion, according to the method for transmitting a signal in a device-to-device proximity service, the base station, and the user equipment in the embodiments of the present invention, time-frequency resources that are not exactly the same are allocated to different user clusters, which can avoid time-frequency resource contention between multiple user clusters, and can effectively reduce a waiting time required for using a time-frequency resource by the user equipment.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 2 shows a schematic flowchart of a method for transmitting a signal in a device-to-device proximity service according to an embodiment of the present invention;

FIG. 3(*a*) to FIG. 3(*d*) show schematic diagrams of a time-frequency resource set and a resource level according to an embodiment of the present invention;

FIG. 4 shows a schematic flowchart of a method for transmitting a signal in a device-to-device proximity service according to another embodiment of the present invention;

FIG. 5 shows a schematic flowchart of a method for transmitting a signal in a device-to-device proximity service according to still another embodiment of the present invention;

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that the technical solution of the present invention may be applied to various communications systems, such as a Global System for Mobile Communications (English full name: Global System of Mobile communication, English abbreviations: GSM) system, a Code Division Multiple Access (English full name: Code Division Multiple Access, English abbreviations: CDMA) system, a Wideband Code Division Multiple Access (English full name: Wideband Code Division Multiple Access, English abbreviations: WCDMA) system, a general packet radio service (English full name: General Packet Radio Service, English abbreviations: GPRS), an LTE system, a Long Term Evolution Advanced (English full name: Advanced Long Term Evolution, English abbreviations: LTE-A) system, and a Universal Mobile Telecommunications System (English full name: Universal Mobile Telecommunication System, English abbreviations: UMTS).

It should be understood that in the embodiments of the present invention, a user equipment (English full name: User Equipment, English abbreviations: UE) includes but is not limited to a mobile station (English full name: Mobile Station, English abbreviations: MS), a mobile terminal (English full name: Mobile Terminal), a mobile telephone (English full name: Mobile Telephone), a handset (English full name: handset), and a portable device (English full name: portable equipment). The user equipment may communicate with one or more core networks by using a radio access network (English full name: Radio Access Network, English abbreviations: RAN). For example, the user equipment may be a mobile telephone (or referred to as a "cellular" telephone), or a computer having a radio communication function; for example, the user equipment may also be a portable, pocket-sized, handheld, computer built-in, or in-vehicle mobile apparatus.

In the embodiments of the present invention, a base station may be a base transceiver station (English full name: Base Transceiver Station, English abbreviations: BTS) in GSM or CDMA, may be an NodeB (NodeB) in WCDMA, or may be an evolved NodeB (English full name: evolved Node B, English abbreviations: eNB or e-NodeB) in LTE, which is not limited in the embodiments of the present invention.

Figure 1:
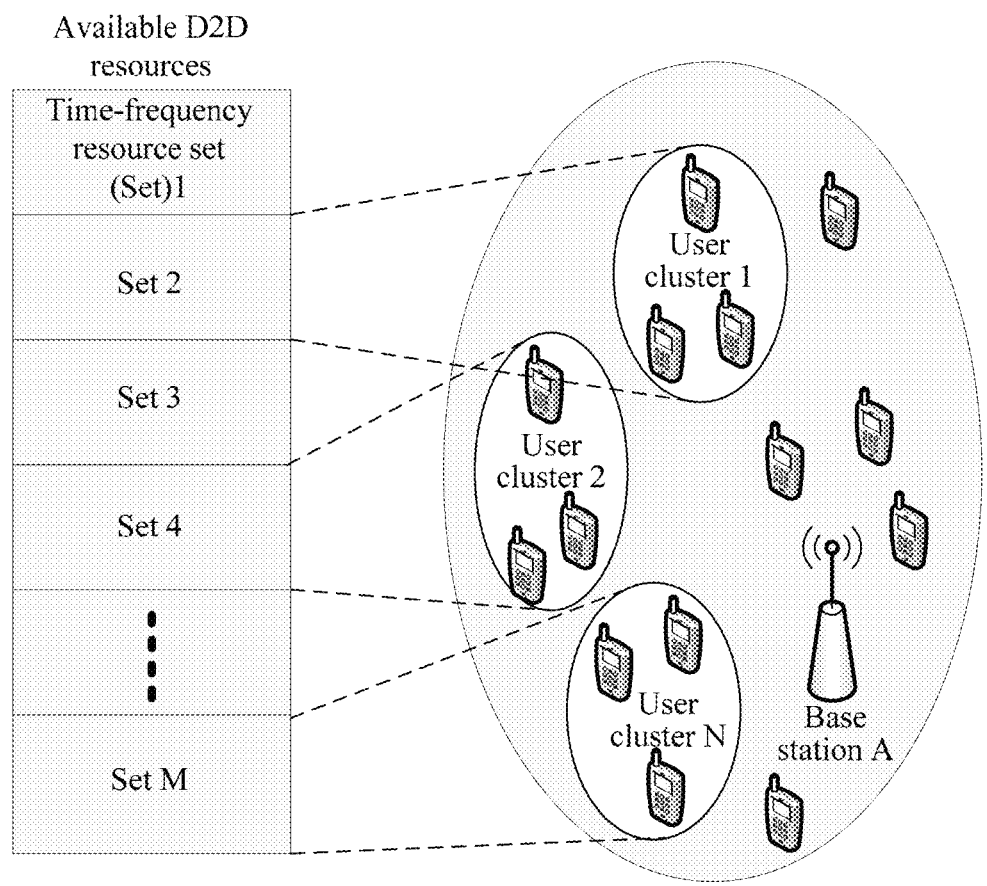
FIG. 1 shows a schematic diagram of a method for allocating a time-frequency resource set to a user cluster according to an embodiment of the present invention.

To help a person skilled in the art better understand the embodiments of the present invention, FIG. 1 shows a schematic diagram of an example of a scenario in which an embodiment of the present invention may be applied. As shown in FIG. 1, a cell covered by a base station A includes N user clusters (FIG. 1 exemplarily shows only three user clusters), and each user cluster includes at least two UEs that can perform a D2D ProSe, that is, at least two UEs in each user cluster can perform D2D communication with each other. As shown in FIG. 1, respective corresponding time-frequency resource sets (Set) may be allocated to the N user clusters. For example, a time-frequency resource set Set2 is allocated to a user cluster 1, a time-frequency resource set Set4 is allocated to a user cluster 2, and a time-frequency resource set SetM is allocated to a user cluster N, which can avoid resource contention between different user clusters, and therefore, a waiting time required for transmitting a signal by a D2D UE can be effectively reduced.

It should be understood that the user cluster in the technical solution of the present invention may be a user group formed by UEs that have a D2D communication function, that is, all UEs in the user cluster can perform D2D communication with each other.

It should be further understood that, the time-frequency resource set in this embodiment of the present invention may be a physical resource block (English full name: Physical Resource Block, English abbreviations: PRB) time-frequency resource set, that is, a minimal resource unit is a PRB; or the time-frequency resource set in this embodiment of the present invention may be a subcarrier time-frequency resource, which is not limited in the present invention.

It should be further understood that FIG. 1 only describes a specific example of an application scenario of this embodiment of the present invention, but this embodiment of the present invention is not limited thereto. For example, a same time time-frequency resource set or time-frequency resource sets that have an intersection set may be allocated to two or more user clusters that are relatively far away from each other, or to multiple user clusters that have relatively small mutual interference. In addition, different user clusters in a cell covered by a base station may include UEs of different quantities; correspondingly, quantities of PRBs included in time-frequency resource sets Set allocated to user clusters with UEs of different quantities may also be different, which is not limited in this embodiment of the present invention.

FIG. 2 shows a method 100 for transmitting a signal in a device-to-device proximity service (D2D ProSe). The method 100 may be executed, for example, by a base station. As shown in FIG. 2, the method 100 includes:

S110: The base station allocates at least one time-frequency resource set to each user cluster in N user clusters in a cell covered by the base station, where at least two time-frequency resource sets in M time-frequency resource sets allocated by the base station to the N user clusters are different, where N is an integer not less than 2, and M is an integer not less than N.

S120: The base station transmits $R^{th}$ information to the $R^{th}$ user cluster in the N user clusters, where the $R^{th}$ information is used to indicate an $R^{th}$ time-frequency resource set that is allocated by the base station to the $R^{th}$ user cluster and used for transmitting a signal, where a value of R is 1, 2, . . . , N separately.

The base station allocates the at least one time-frequency resource set to each user cluster in the N user clusters in the cell (that is, a serving cell) covered by the base station. At least two time-frequency resource sets in the M time-frequency resource sets allocated by the base station to the N user clusters are different, that is, there are at least a time-frequency resource set r (belonging to a user cluster r) and a time-frequency resource set t (belonging to a user cluster t) that are completely different in terms of a time domain and a frequency domain, where r and t are different, and both r and t are between 1 and N.

The base station transmits the $R^{th}$ information to the $R^{th}$ user cluster in the N user clusters, where the $R^{th}$ information is used to indicate the $R^{th}$ time-frequency resource set that is allocated by the base station to the $R^{th}$ user cluster and used for transmitting a signal, so that a user equipment in the $R^{th}$ user cluster can perform signal transmission according to the $R^{th}$ time-frequency resource set, for example, transmitting a discovery signal. The $R^{th}$ time-frequency resource set is a time-frequency resource set that is corresponding to the $R^{th}$ user cluster and in the M time-frequency resource sets allocated by the base station to the N user cluster, where the value of R is set to 1, 2, . . . , N separately.

Therefore, according to the method for transmitting a signal in a D2D ProSec in this embodiment of the present invention, time-frequency resources that are not exactly the same are allocated to different user clusters, which can avoid time-frequency resource contention between multiple user clusters, and can effectively reduce a waiting time required for using a time-frequency resource by a user equipment.

It should be understood that, in S120, the base station transmits the $R^{th}$ information to the $R^{th}$ user cluster in the N user clusters, where the $R^{th}$ information is used to indicate the $R^{th}$ time-frequency resource set that is allocated by the base station to the $R^{th}$ user cluster and used for transmitting a signal, where the value of R is 1, 2, . . . , N separately, which specifically means that: the base station sends, to each user cluster in the covered cell, information used for indicating respective time-frequency resource sets. It should be understood that the base station may deliver a broadcasting message to each user cluster in a form of broadcasting, where the broadcasting message includes information that is used to indicate a time-frequency resource set separately allocated by the base station to each user cluster, for example, first information that is used to indicate a first time-frequency resource set allocated by the base station to the first user cluster, second information that is used to indicate a second time-frequency resource set allocated by the base station to the second user cluster, . . . , and $N^{th}$ information that is used to indicate an $N^{th}$ time-frequency resource set allocated by the base station to the $N^{th}$ user cluster. The base station may also separately send, to each user cluster, a message that is used to indicate a time-frequency resource set allocated by the base station, for example, send a first message to the first user cluster, where the first message includes the first information that is used to indicate the first time-frequency resource set allocated by the base station to the first user cluster; send a second message to the second user cluster, where the second message includes the second information that is used to indicate the second time-frequency resource set allocated by the base station to the second user cluster; and by analogy, send an $N^{th}$ message to the $N^{th}$ user cluster, where the $N^{th}$ message includes the $N^{th}$ information that is used to indicate the $N^{th}$ time-frequency resource set allocated by the base station to the $N^{th}$ user cluster. That is, a type of the message is not limited in this embodiment of the present invention.

In S110, the base station allocates a time-frequency resource set to each user cluster in the serving cell. Option- ally, all available D2D resources in the serving cell may be divided into M time-frequency resource sets, and the M time-frequency resource sets are separately allocated to each user cluster in the cell. Specifically, as shown in FIG. 1, a base station A divides all available D2D time-frequency resources (D2D Bandwidth) into M block, that is, Set1, Set2, . . . , SetM. According to the M time-frequency resource sets, at least one time-frequency resource set is allocated to each user cluster in the cell. That is, one time-frequency resource set may be allocated to each user cluster; or multiple time-frequency resource sets are allocated to each user cluster; or one time-frequency resource set is allocated to some user clusters, and multiple time-frequency resource sets are allocated to some other user clusters, which is not limited in this embodiment of the present invention.

At least two time-frequency resource sets in the M time-frequency resource sets allocated to the N user clusters are different.

Optionally, as an embodiment, in the method 100 shown in FIG. 2, any two time-frequency resource sets in the M time-frequency resource sets of the N user clusters have no intersection set.

Specifically, as shown in FIG. 1, as an example, a serving cell of the base station A includes three user clusters (user clusters 1, 2, and N), the time-frequency resource set Set2 is allocated to the user cluster 1, the time-frequency resource set Set4 is allocated to the user cluster 2, and the time-frequency resource set SetM is allocated to the user cluster N. The time-frequency resource sets Set2, Set4, and SetM have no intersection set in terms of a time domain and a frequency domain, that is, completely different time-frequency resource sets are allocated to different user clusters. For example, for a UE in the user cluster 1, the time-frequency resource set Set2 may be directly used to transmit a signal, and it is unnecessary to contend for a resource with a UE in another user cluster, which can effectively reduce a waiting time required for signal transmission, thereby improving efficiency of signal transmission.

In this embodiment of the present invention, when the base station allocates a time-frequency resource set to each user cluster in the cell, a same time-frequency resource set or time-frequency resource sets that at least have an intersection set may be allocated to user clusters that have small mutual interference, for example, the user cluster 1 and the user cluster N that are relatively far from each other in FIG. 1. Specifically, respective time-frequency resource sets may be allocated to user clusters according to information about interference between the user clusters.

Optionally, as an embodiment, that the base station allocates at least one time-frequency resource set to each user cluster in N user clusters in a cell covered by the base station in S110 includes that:

the base station allocates the at least one time-frequency resource set to each user cluster in the N user clusters according to information about interference between the N user clusters.

Specifically, a corresponding time-frequency resource set may be allocated to a user cluster according to channel information of the user cluster. Still using FIG. 1 as an example, when it is determined that on the time-frequency resource set Set4, interference between the user cluster 1 and the user cluster 2 is less than an interference threshold, the time-frequency resource set Set4 may be allocated to both the user cluster 1 and the user cluster 2; or assuming that a distance between the user cluster 1 and the user cluster N is relatively long, time-frequency resource sets that have an intersection set may be allocated to the user cluster 1 and the user cluster N, for example, a time-frequency resource set E is allocated to the user cluster 1 and a time-frequency resource set F is allocated to the user cluster N, where the time-frequency resource set E and the time-frequency resource set F have an intersection set in terms of the frequency domain. If it is detected that on the Set4, the interference between the user cluster 1 and the user cluster 2 is greater than a particular threshold, time-frequency resource sets that have no intersection set in terms of both the time domain and the frequency domain are allocated to the user cluster 1 and the user cluster 2.

Optionally, as an embodiment, that the base station allocates the at least one time-frequency resource set to each user cluster in the N user clusters according to information about interference between the N user clusters includes that:

when it is determined that interference between the $i^{th}$ user cluster and the $j^{th}$ user cluster in the N user clusters is greater than or equal to a first threshold, an $i_1^{th}$ time-frequency resource set is allocated to the $i^{th}$ user cluster, and a $j_1^{th}$ time-frequency resource set is allocated to the $j^{th}$ user cluster, where the time-frequency resource set and the $j_1^{th}$ time-frequency resource set have no intersection set; or when it is determined that interference between the $i^{th}$ user cluster and the $j^{th}$ user cluster is less than or equal to a second threshold, an $i_2^{th}$ time-frequency resource set is allocated to the $i^{th}$ user cluster, and a $j_2^{th}$ time-frequency resource set is allocated to the $j^{th}$ user cluster, where the $i_2^{th}$ time-frequency resource set and the $j_2^{th}$ time-frequency resource set have an intersection set; where the second threshold is not greater than the first threshold, i is any integer from 1 to N, and j is any integer, except i, from 1 to N.

It should be understood that the first threshold and the second threshold may be determined by using a technology related to channel interference, where the second threshold may be equal to the first threshold, or the second threshold may be less than the first threshold, which is not limited in this embodiment of the present invention. It should be further understood that the $i^{th}$ user cluster and the $j^{th}$ user refer to any two different user clusters in the N user clusters, and when the base station allocates a time-frequency resource set to each user cluster in the N user clusters, a corresponding time-frequency resource set may be determined by using information about interference between the user cluster and another user cluster. Specifically, as shown in FIG. 1, when it is determined that the interference between the user cluster 1 and the user cluster 2 is greater than the first threshold, the time-frequency resource set Set2 is allocated to the user cluster 1, and the time-frequency resource set Set4 is allocated to the user cluster 2, where the Set2 and the Set4 have no intersection set in terms of the time domain and the domain; when it is determined that the interference between the user cluster 1 and the user cluster 2 is less than the second threshold, the time-frequency resource set Set2 is allocated to the user cluster 1, and the time-frequency resource set Set4 is allocated to the user cluster 2, where the Set2 and the Set4 may have an intersection set in terms of the time domain or the frequency domain.

Allocating, to different user clusters, time-frequency resource sets that have an intersection set can improve resource utilization.

Therefore, according to the method for transmitting a signal in a D2D ProSe in this embodiment of the present invention, time-frequency resources that are not exactly the same are allocated to different user clusters, which avoids resource contention between different user clusters; in addition, a same time-frequency resource or time-frequency resources that have an intersection set are allocated to two or more user clusters that have relatively small interference, which can improve resource utilization.

It should be understood that the time-frequency resource set in this embodiment of the present invention may be a physical resource block (English full name: Physical Resource Block, English abbreviations: PRB) time-frequency resource.

Optionally, as an embodiment, in the method 100 shown in FIG. 2, the M time-frequency resource sets of the N user clusters are all PRB time-frequency resource sets.

It should be understood that a minimal resource unit of the time-frequency resource set allocated to the user cluster is a PRB, for example, one time-frequency resource set includes eight PRBs. Specifically, PRBs included in the time-frequency resource set may be consecutively or inconsecutively configured in terms of the time domain and/or the frequency domain. In addition, quantities of PRBs included in time-frequency resource sets allocated to different user clusters may be different. Specifically, a quantity of PRBs included in the time-frequency resource set allocated to the user cluster may be determined according to a quantity of UEs included in the user cluster. This embodiment of the present invention sets no limitation thereto.

It should be further understood that, optionally, the M time-frequency resource sets of the N user clusters may also be subcarrier time-frequency resource sets, that is, a minimal resource unit of the time-frequency resource set is a subcarrier. This embodiment of the present invention sets no limitation thereto.

In S120, the base station transmits the $R^{th}$ information to the $R^{th}$ user cluster in the N user clusters, where the $R^{th}$ information is used to indicate the $R^{th}$ time-frequency resource set that is allocated by the base station to the $R^{th}$ user cluster and used for transmitting a signal, so that a UE in the $R^{th}$ user cluster sends and/or receives the signal according to the first time-frequency resource set.

It should be understood that, the base station may send information to each user cluster in the N user clusters, so as to notify each user cluster of respective allocated time-frequency resource sets; and for ease of description in this specification, the $R^{th}$ user cluster (a value of R is 1, . . . , N separately) is used to represent any user cluster in the N user clusters, but sets no limit to a technical solution of this embodiment of the present invention, and the $R^{th}$ user cluster is not limited to a particular user cluster in the N user clusters.

It should be further understood that, the base station may send the $R^{th}$ information to the $R^{th}$ user cluster by using a paging message or a system message, which is not limited in this embodiment of the present invention. Specifically, the base station may separately send, to each user cluster in the N user clusters in the serving cell, information that is used to indicate a time-frequency resource set allocated by the base station; and the base station may also deliver a broadcasting message to the N user clusters in a form of broadcasting, so as to notify each user cluster of the time-frequency resource set allocated by the base station. More specifically, the $R^{th}$ time-frequency resource set allocated by the base station to the $R^{th}$ user cluster may be directly notified of the $R^{th}$ information delivered by the base station to the $R^{th}$ user cluster; the base station may also deliver a correspondence between a user identifier of the $R^{th}$ user cluster and an $R^{th}$ time-frequency resource to the $R^{th}$ user cluster, and correspondingly, a UE in the $R^{th}$ user cluster may determine the $R^{th}$ time-frequency resource set according to the user identifier and the correspondence.

Optionally, as an embodiment, in the method 100 shown in FIG. 2, the $R^{th}$ information includes the correspondence between the user identifier of the $R^{th}$ user cluster and the $R^{th}$ time-frequency resource set.

Specifically, the correspondence may be Set_Index=f (Cluster ID), where Cluster ID is a user identifier of a user cluster, Set_Index is a number or an index that is used to indicate a time-frequency resource set, and f( ) is a mathematical model that is used to represent a correspondence between the user identifier and the time-frequency resource set.

It should be understood that, the M time-frequency resource sets in this embodiment of the present invention may be PRB time-frequency resource sets, that is, a minimal time-frequency unit is a PRB. For example, one time-frequency resource set includes one or more PRBs. For example, the $R^{th}$ time-frequency resource set allocated by the base station to the $R^{th}$ user cluster includes eight PRBs, and a first user equipment (UE) in the $R^{th}$ user cluster may send a discovery signal to a second UE in the $R^{th}$ user cluster according to the $R^{th}$ time-frequency resource set. Specifically, the first UE may use any one or multiple PRBs or any combination of PRBs in the eight PRBs to send the signal to the second UE. Randomness of a PRB used by a transmit end (the first UE) to send the signal increases complexity of detecting the signal by a receive end (the second UE).

To reduce the complexity of detecting the signal by the receive end and efficiently detect the signal sent by the transmit end, the transmit end may report, to the base station, a rule for using a time-frequency resource for sending the signal by the transmit end, so that the base station notifies the receive end.

Optionally, as an embodiment, in the method 100 shown in FIG. 2, the method 100 further includes:

receiving, by the base station, a first message that is sent by the first user equipment in the $R^{th}$ user cluster and that carries a resource level of P, where the first message is used to instruct the first UE to use the $(1+P \times k)^{th}$ to the $(P \times (k+1))^{th}$ PRBs of the first time-frequency resource set to send the signal to the second UE in the $R^{th}$ user cluster, where P is a positive integer not greater than Q, a value range of k is a non-negative integer less than a rounded number of (Q/P), and Q is a quantity of PRBs included in the $R^{th}$ time-frequency resource set; and sending, by the base station according to the first message, a second message that carries the resource level of P to the second UE, so that the second user equipment uses the second message when detecting, on the $R^{th}$ time-frequency resource set, the signal sent by the first user equipment.

Specifically, as an example, the $R^{th}$ time-frequency resource set allocated by the base station to the $R^{th}$ user cluster includes eight PRBs. FIG. 3(*a*), FIG. 3(*b*), FIG. 3(*c*), and FIG. 3(*d*) respectively show cases in which the resource level is respectively 1, 2, 4, and 8. FIG. 3(*a*) shows the case in which the resource level P is 1. A rule for sending a signal on the first time-frequency resource set by the transmit end (the first UE) is as follows: the transmit end (the first UE) may send the signal on any one of the eight PRBs, that is, the transmit end (the first UE) occupies only one PRB in the first time-frequency resource set to send the signal to the receive end (the second UE). Accordingly, a rule for detecting the signal from the transmit end (the first UE) on the first time-frequency resource set by the receive end (the second UE) is as follows: detection is performed starting from the first PRB of the first time-frequency resource set: a PRB1 is first detected; if no correct signal is detected, a PRB2 is detected; if still no correct signal is detected, a PRB3 is then detected, and so on, until a correct signal is detected.

FIG. 3(*b*) shows the case in which the resource level is 2. A rule for sending a signal on the first time-frequency resource set by the transmit end (the first UE) is as follows: the transmit end (the first UE) may send the signal on the first and the second PRBs, or send the signal on the third and the fourth PRBs, or send the signal on the fifth and the sixth PRBs, or send the signal on the seventh and the eighth PRBs, that is, two PRBs may be used to send the signal, and the two PRBs must be any one of the foregoing four combinations. Accordingly, a rule for detecting the signal from the transmit end (the first UE) on the first time-frequency resource set by the receive end (the second UE) is as follows: the signal is detected first on the first and the second PRBs, and it should be noted that, the first and the second PRBs are detected at the same time, which is equivalent to that the first and the second PRBs are treated as one logical PRB for detection; if no correct signal is detected, similarly, subsequent detection is sequentially performed on the third and the fourth PRBs, on the fifth and sixth PRBs, and on the seventh and the eighth PRBs until a correct signal is detected.

FIG. 3(*c*) shows the case in which the resource level is 4. A rule for sending a signal on the first time-frequency resource set by the transmit end (the first UE) is as follows: the transmit end (the first UE) may send the signal on the first to the fourth PRBs, or send the signal on the fifth to the eighth PRBs, that is, four PRBs may be used to send the signal, and the four PRBs must be either of the foregoing two combinations. Accordingly, a rule for detecting the signal from the transmit end (the first UE) on the first time-frequency resource set by the receive end (the second UE) is as follows: the signal is first detected on the first to the fourth PRBs, and it should be noted that, the first to the fourth PRBs are detected at the same time, which is equivalent to that the first to the fourth PRBs are treated as one logical PRB for detection; if no correct signal is detected, detection is then performed on the fifth to the eighth PRBs until a correct signal is detected.

FIG. 3(*d*) shows the case in which the resource level is 8. A rule for sending a signal on the first time-frequency resource set by the transmit end (the first UE) is as follows: the transmit end (the first UE) occupies the eight PRBs to send the signal. Accordingly, the receive end (the second UE) performs detection on the eight PRBs, and it should be understood that, overall detection is performed on the eight PRBs, which is equivalent to that the eight PRBs are treated as one logical PRBs for detection, so as to detect the signal sent by the transmit end (the first UE).

It should be understood that, the examples shown in FIG. 3 are to help a person skilled in the art better understand this embodiment of the present invention, but not to limit the scope of this embodiment of the present invention. In the examples in FIG. 3(*a*) to FIG. 3(*d*), one time-frequency resource set includes eight PRBs, and the cases in which the resource level is 1, 2, 4, and 8 are respectively shown. However, this embodiment of the present invention is not limited thereto. For example, a quantity of PRBs included in the $R^{th}$ time-frequency resource set allocated by the base station to the $R^{th}$ user cluster may be larger or smaller, and the resource level may also be any positive integer not greater than the quantity of the PRBs. For example, the first time-frequency resource includes 10 PRBs; then, the resource level P may be any value from 1 to 10. For example, the resource level P is 5, and a rule for sending a signal on the first time-frequency resource set by the transmit end is as follows: the signal may be sent on the first to the fifth PRBs of the first time-frequency resource set to the receive end (the second UE), or the signal may be sent on the sixth to the tenth PRBs; accordingly, a rule for detecting the signal from the transmit end (the first UE) on the first time-frequency resource set by the receive end (the second UE) is as follows: the receive end (the second UE) first detects the signal on the first to the fifth PRBs, and if the signal is not detected, detection is then performed on the sixth to the tenth PRBs until the signal sent by the transmit end (the first UE) is detected.

The foregoing used sending and receiving rules based on the resource level P may be predefined by using a system, so that the rules are known to both the transmit end and the receive; or the rules may be delivered by the base station to the transmit end and the receive end.

Optionally, as an embodiment, in the method 100 shown in FIG. 2, before the base station receives the first message, the method further includes:

transmitting, by the base station, third information to the $R^{th}$ user cluster, where the third information is used to instruct to use the $(1+P \times k)^{th}$ to the $(P \times (k+1))^{th}$ PRBs of the $R^{th}$ time-frequency resource set to send the signal, where a value range of the resource level P is a positive integer not greater than Q, and a value range of k is a non-negative integer less than the rounded number of (Q/P).

It should be understood that the third information that is transmitted by the base station to the $R^{th}$ user cluster is used to indicate a rule for sending the signal on the $R^{th}$ time-frequency resource set, but a specific numeric value of the resource level P and a specific value of k are not limited. After a UE in the $R^{th}$ user cluster receives the third information, the UE may determine the specific values of the resource level P and k according to the third information.

It should be further understood that, the base station may add the third information and the $R^{th}$ information to a same message sent to the $R^{th}$ user cluster, which is not limited in this embodiment of the present invention. Specifically, for example, the base station sends a message A to the $R^{th}$ user cluster, where the message A is used to indicate the $R^{th}$ time-frequency resource set and the resource level P, so that the $R^{th}$ user cluster determines an available time-frequency resource set, and uses the resource level P to transmit a signal on the $R^{th}$ time-frequency resource set.

According to the method for transmitting a signal in a D2D ProSe in this embodiment of the present invention, a resource level is used to send and receive a signal, which can effectively reduce complexity of receiving the signal.

Therefore, according to the method for transmitting a signal in a D2D ProSe in this embodiment of the present invention, time-frequency resources that are not exactly the same are separately allocated to different user clusters, which can effectively avoid resource contention between different user clusters; in addition, a same time-frequency resource or time-frequency resources that have an intersection set may be allocated to different user clusters that have relatively small mutual interference, that is, a same resource may be used by two or more user clusters, which can effectively improve time-frequency resource utilization; in addition, a user equipment is instructed to use a resource level to send and receive a signal, which can effectively reduce complexity of receiving the signal.

It should be understood that, in various embodiments of the present invention, sequence numbers of the foregoing processes do not mean execution sequences. The execution sequences of the processes should be determined according to functions and internal logic of the processes, and should not set any limitation on the implementation processes of the embodiments of the present invention.

With reference to FIG. 1 to FIG. 3, the method for transmitting a signal in a D2D ProSe according to this embodiment of the present invention is described above in detail from a perspective of a base station. With reference to FIG. 4, a method for transmitting a signal in a D2D ProSe according to an embodiment of the present invention is described in the following from a perspective of a first user equipment.

As shown in FIG. 4, a method 200 for transmitting a signal in a D2D ProSe in the embodiment of the present invention may be executed, for example, by a first user equipment (UE). The method 200 includes:

S210: The first UE receives a first message sent by a base station, where the first message is used to indicate a first time-frequency resource set allocated by the base station to a first user cluster to which the first UE belongs, and the first time-frequency resource set is different from a second time-frequency resource set allocated by the base station to at least one another user cluster in a cell covered by the base station.

S220: The first UE sends a signal to a second UE according to the first time-frequency resource set, where the second UE belongs to the first user cluster.

Therefore, according to the method for transmitting a signal in a D2D ProSe in this embodiment of the present invention, the signal may be transmitted directly according to a time-frequency resource allocated by a base station, which avoids resource contention with a user equipment in another user cluster, and can effectively reduce a waiting time required for using the time-frequency resource by the user equipment.

It should be understood that the first time-frequency resource set, which is indicated by the first message and is allocated by the base station to the first user cluster to which the first UE belongs, is different from the second time-frequency resource set allocated by the base station to the at least one another user cluster in the cell covered by the base station, which specifically means that: the first time-frequency set is completely different from a time-frequency resource set allocated to one or more user clusters in the cell covered by the base station, that is, there is no intersection set in terms of a time domain and a frequency domain, that is, there are no identical resources.

In S220, the first UE sends the signal to the second UE according to the first time-frequency resource set. The signal herein may be any signal transmitted from a device to a device, for example, a discovery signal.

Optionally, as an embodiment, in the method 200 shown in FIG. 4, interference between the first user cluster and the at least one another user cluster is greater than or equal to a first threshold.

It should be understood that, when interference between the first user cluster to which the first UE belongs and a second user cluster in the cell covered by the base station is less than a particular threshold, the first time-frequency resource set may have an intersection set, in terms of the time domain or the frequency domain, with a third time-frequency resource set allocated by the base station to the second user cluster.

Specifically, as shown in FIG. 1, when it is determined that interference between a user cluster 1 and a user cluster 2 is greater than the first threshold, a time-frequency resource set Set2 is allocated to the user cluster 1, and a time-frequency resource set Set4 is allocated to the user cluster 2, where the Set2 and the Set4 have no intersection set in terms of both the time domain and the domain. When it is determined that the interference between the user cluster 1 and the user cluster 2 is less than a second threshold, the time-frequency resource set Set2 is allocated to the user cluster 1, and the time-frequency resource set Set4 is allocated to the user cluster 2, where the Set2 and the Set4 may have an intersection set in terms of the time domain or the frequency domain. The first user cluster in this embodiment of the present invention may be corresponding to the user cluster 1 in FIG. 1.

It should be understood that the foregoing second threshold may be equal to the first threshold, or may be less than the first threshold, which is not limited in this embodiment of the present invention.

In S210, the first UE receives the first message sent by the base station. It should be understood that the first message may be a paging message or a system message, which is not limited in this embodiment of the present invention.

More specifically, the first time-frequency resource set allocated to the first UE may be directly notified by using the first message delivered by the base station to the first UE; or the base station may deliver a correspondence between a user identifier of the first user cluster to which the first UE belongs and a first time-frequency resource to the first UE, and correspondingly, the first UE may determine the first time-frequency resource set according to the user identifier and the correspondence.

Optionally, as an embodiment, in the method 200 shown in FIG. 4, the first message includes the correspondence between the user identifier of the first user cluster and the first time-frequency resource set.

That the first UE sends a signal to a second UE according to the first time-frequency resource set includes that:

the first UE determines the first time-frequency resource set according to the correspondence; and the first UE sends the signal to the second UE according to the first time-frequency resource set.

Specifically, the correspondence may be Set_Index=f (Cluster ID), where Cluster ID is a user identifier of a user cluster, Set_Index is a number or an index that is used to indicate a time-frequency resource set, and f( ) is a mathematical model that is used to represent a correspondence between the user identifier and the time-frequency resource set.

Optionally, as an embodiment, in the method 200 shown in FIG. 4, the first time-frequency resource set is a physical resource block (PRB) time-frequency resource set.

It should be understood that a minimal resource unit of a time-frequency resource set allocated to the first user cluster to which the first UE belongs is a PRB, for example, one time-frequency resource set includes eight PRBs. Specifically, PRBs included in the time-frequency resource set may be consecutively or inconsecutively configured in terms of the time domain and/or the frequency domain. In addition, quantities of PRBs included in time-frequency resource sets allocated to different user clusters may be different, which is not limited in this embodiment of the present invention.

It should be further understood that, optionally, the first time-frequency resource set may also be a subcarrier time-frequency resource set, that is, a minimal resource unit of the first time-frequency resource set is a subcarrier. This embodiment of the present invention sets no limitation thereto.

It should be understood that, in this embodiment of the present invention, the first time-frequency resource set may be a PRB time-frequency resource set, that is, the first time-frequency resource set includes one or more PRBs, for example, the first time-frequency resource set includes eight PRBs, and the first UE may use any one or multiple PRBs or any combination of PRBs in the eight PRBs to send the signal to the second UE. Randomness of a PRB used by a transmit end (the first UE) to send the signal may increase complexity of detecting the signal by a receive end (the second UE).

To reduce the complexity of detecting the signal by the receive end (the second UE), the transmit end (the first UE) may send the signal to the receive end (the second UE) according to a particular rule by using the first time-frequency resource.

Optionally, as an embodiment, that the first UE sends a signal to a second UE according to the first time-frequency resource set in S220 includes that:

the first UE uses the $(1+P\times k)^{th}$ to the $(P\times(k+1))^{th}$ PRBs of the first time-frequency resource set to send the signal to the second UE, where P is a resource level and is a positive integer not greater than Q, k is a non-negative integer less than a rounded number of (Q/P), and Q is a quantity of PRBs included in the first time-frequency resource set.

Specifically, as an example, the first time-frequency resource set includes eight PRBs. FIG. 3(a), FIG. 3(b), FIG. 3(c), and FIG. 3(d) respectively show cases in which the resource level is respectively 1, 2, 4, and 8. For how the transmit end sends a signal and how the receive end detects the signal, refer to the foregoing description, and details are not described herein again.

Further, to enable the receive end (the second UE) to obtain a rule that is specifically used by the transmit end (the first UE) to send the signal, for example, a specific numeric value of the resource level, so as to reduce complexity of detecting the signal, the transmit end (the first UE) may report, to the base station, a rule for using a time-frequency resource to send the signal by the transmit end, so that the base station notifies the receive end (the second UE).

Optionally, as an embodiment, in the method 200 shown in FIG. 4, the method further includes:

sending, by the first UE, a second message that carries the resource level of P to the base station, where the second message is used to trigger the base station to send a third message that carries the resource level of P to the second UE, so that the second UE uses the third message when detecting, on the first time-frequency resource set, the signal sent by the first UE.

The foregoing used sending and receiving rules based on the resource level P may be predefined by using a system, so that the rules are known to both the transmit end and the receive; or the rules may be delivered by the base station to the transmit end and the receive end.

Optionally, as an embodiment, before the first UE sends the signal to the second UE according to the first time-frequency resource set in S220, the method further includes:

receiving, by the first UE, a fourth message sent by the base station, where the fourth message is used to instruct to use the $(1+P\times k)^{th}$ to the $(P\times(k+1))^{th}$ PRBs of the first time-frequency resource set to send the signal, where a value range of the resource level P is a positive integer not greater than Q, and a value range of k is a non-negative integer less than the rounded number of (Q/P).

It should be understood that the fourth message that is sent by the base station to the first UE is used to indicate the resource level P used for sending the signal on the first time-frequency resource set, but a specific numeric value of the resource level P and a specific value of k are not limited. After a UE in the first user cluster receives the fourth message, the UE may determine the specific numeric values of the resource level P and k according to the fourth message.

It should be further understood that the fourth message may be the first message, that is, by receiving the first message, the first UE not only learns the first time-frequency resource set allocated to the first user cluster to which the first UE belongs, but also learns the rule for using the time-frequency resource, for example, the resource level P.

According to the method for transmitting a signal in a D2D ProSe in this embodiment of the present invention, a resource level is used to send and receive a signal, which can effectively reduce complexity of receiving the signal.

Therefore, according to the method for transmitting a signal in a D2D ProSe in this embodiment of the present invention, the signal may be transmitted directly according to a time-frequency resource allocated by a base station, which avoids resource contention with a user equipment in another user cluster, and can effectively reduce a waiting time required for using the time-frequency resource by the user equipment; in addition, a same time-frequency resource may be shared between different user clusters that have relatively small mutual interference, which can effectively improve time-frequency resource utilization; in addition, a resource level is used to send the signal, which can effectively reduce the complexity of receiving the signal.

It should be understood that, in various embodiments of the present invention, sequence numbers of the foregoing processes do not mean execution sequences. The execution sequences of the processes should be determined according to functions and internal logic of the processes, and should not set any limitation on the implementation processes of the embodiments of the present invention.

With reference to FIG. 1 to FIG. 4, the method for transmitting a signal in a D2D ProSe according to the embodiments of the present invention is described above in detail from a perspective of the base station and the first UE that sends a signal. With reference to FIG. 5, a method for transmitting a signal in a D2D ProSe in an embodiment of the present invention is described in the following from a perspective of a second UE that receives the signal.

As shown in FIG. 5, a method 200 for transmitting a signal in a D2D ProSe in the embodiment of the present invention may be executed, for example, by the second user equipment (UE). The method 300 includes:

S310: The second UE receives a first message sent by a base station, where the first message is used to indicate a first time-frequency resource set allocated by the base station to a first user cluster to which the second UE belongs, and the first time-frequency resource set is different from a second time-frequency resource set allocated by the base station to at least one another user cluster in a cell covered by the base station.

S320: The second UE detects, according to the first time-frequency resource set, a signal sent by a first UE, where the first UE belongs to the first user cluster.

Therefore, according to the method for transmitting a signal in a D2D ProSe in this embodiment of the present invention, the signal may be transmitted directly according to a time-frequency resource allocated by the base station, which avoids resource contention with a user equipment in another user cluster, and can effectively reduce a waiting time required for using the time-frequency resource by the user equipment.

It should be understood that the first time-frequency resource set, which is indicated by the first message and is allocated by the base station to the first user cluster to which the second UE belongs, is different from the second time-frequency resource set allocated by the base station to the at least one another user cluster in the cell covered by the base station, which specifically means that: the first time-frequency set allocated to the first user cluster definitely is completely different from a time-frequency resource set allocated to one or more user clusters in the cell covered by the base station, that is, there is no intersection set in terms of a time domain and a domain, that is, there are no identical resources.

It should be further understood that, in S320, the second UE detects, according to the first time-frequency resource set, the signal sent by the first UE, and the signal herein may be any signal transmitted from a device to a device D2D, specifically, for example, a discovery signal.

Optionally, as an embodiment, in the method 300 shown in FIG. 5, interference between the first user cluster and the at least one (for example, a third user cluster) another user cluster in the cell covered by the base station is greater than or equal to a first threshold.

It should be understood that, when interference between the first user cluster to which the second UE belongs and a second user cluster in the cell covered by the base station is less than a particular threshold, the first time-frequency resource set allocated to the first user cluster may have an intersection set, in terms of the time domain or the frequency domain, with a third time-frequency resource set allocated to the second user cluster.

Optionally, as an embodiment, in the method 300 shown in FIG. 5, the first time-frequency resource set has an intersection set with the third time-frequency resource set allocated by the base station to the second user cluster in the cell, and interference between the first user cluster and the second user cluster is less than or equal to a second threshold, where the second user cluster is one user cluster or multiple user clusters other than the first user cluster and the third user cluster in the cell.

Specifically, as shown in FIG. 1, when it is determined that interference between a user cluster 1 and a user cluster 2 is greater than the first threshold, a time-frequency resource set Set2 is allocated to the user cluster 1, and a time-frequency resource set Set4 is allocated to the user cluster 2, where the Set2 and the Set4 have no intersection set in terms of the time domain or the frequency domain. When it is determined that the interference between the user cluster 1 and the user cluster 2 is less than the second threshold, the time-frequency resource set Set2 is allocated to the user cluster 1, and the time-frequency resource set Set4 is allocated to the user cluster 2, where the Set2 and the Set4 may have an intersection set in terms of the time domain or the frequency domain. The first user cluster in this embodiment of the present invention may be corresponding to the user cluster 1 in FIG. 1.

It should be understood that the foregoing second threshold may be equal to the first threshold, or may be less than the first threshold, which is not limited in this embodiment of the present invention.

In S310, the second UE receives the first message sent by the base station. It should be understood that the first message may specifically be a paging message or a system message, which is not limited in this embodiment of the present invention.

More specifically, the first time-frequency resource set allocated to the second UE may be directly notified by using the first message delivered by the base station to the second UE; or the base station may deliver a correspondence between a user identifier of the first user cluster to which the second UE belongs and a first time-frequency resource to the second UE, correspondingly, the second UE may determine the first time-frequency resource set according to the user identifier and the correspondence.

Optionally, as an embodiment, in the method 300 shown in FIG. 5, the first message includes the correspondence between the user identifier of the first user cluster and the first time-frequency resource set.

That the second UE detects, according to the first time-frequency resource set, a signal sent by a first UE includes that:

the second UE determines the first time-frequency resource set according to the correspondence; and the second UE detects, according to the first time-frequency resource set, the signal sent by the first UE.

Specifically, the correspondence may be Set_Index=f (Cluster ID), where Cluster ID is a user identifier of a user cluster, Set_Index is a number or an index that is used to indicate a time-frequency resource set, and f( ) is a mathematical model that is used to represent a correspondence between the user identifier and the time-frequency resource set.

Optionally, as an embodiment, in the method 300 shown in FIG. 5, the first time-frequency resource set is a physical resource block (PRB) time-frequency resource set.

It should be understood that a minimal resource unit of a time-frequency resource set allocated to the first user cluster to which the second UE belongs is a PRB. For example, one time-frequency resource set includes eight PRBs. Specifically, PRBs included in the time-frequency resource set may be consecutively or inconsecutively configured in terms of the time domain and/or the frequency domain. In addition, quantities of PRBs included in time-frequency resource sets allocated to different user clusters may be different, which is not limited in this embodiment of the present invention.

It should be further understood that, optionally, the first time-frequency resource set may also be a subcarrier time-frequency resource set, that is, a minimal resource unit of the first time-frequency resource set is a subcarrier. This embodiment of the present invention sets no limitation thereto.

It should be understood that, in this embodiment of the present invention, the first time-frequency resource set may be a PRB time-frequency resource set, that is, the first time-frequency resource set includes one or more PRBs. For example, the first time-frequency resource set includes eight PRBs, and the first UE may use any one or multiple PRBs or any combination of PRBs in the eight PRBs to send the signal to the second UE. Randomness of a PRB used by a transmit end (the first UE) to send the signal increases complexity of detecting the signal by a receive end (the second UE).

The second UE may detect the signal sent by the first UE according to the first time-frequency resource set by receiving indication information that is delivered by the base station and used to indicate a rule for using the time-frequency resource to send the signal by the transmit end (the first UE).

Optionally, as an embodiment, in the method 300 shown in FIG. 5, the method further includes:

receiving, by the second UE, a second message sent by the base station, where the second message is used to instruct to detect the signal on the $(1+P\times k)^{th}$ to the $(P\times(k+1))^{th}$ PRBs of the first time-frequency resource set, where P is a resource level and is a positive integer not greater than Q, a value range of k is a non-negative integer less than a rounded number of (Q/P), and Q is a quantity of PRBs included in the first time-frequency resource set.

That the second UE detects, according to the first time-frequency resource set, a signal sent by a first UE includes that:

the second UE successively performs, according to the second message, blind detection on the $(1+P\times k)^{th}$ to the $(P\times(k+1))^{th}$ PRBs of the first time-frequency resource set until the signal is detected, where a value of k is 0, 1, . . . , L separately, and L is equal to a difference obtained by subtracting 1 from an integer part of (Q/P).

Specifically, as an example, the first time-frequency resource set includes eight PRBs. FIG. 3(*a*), FIG. 3(*b*), FIG. 3(*c*), and FIG. 3(*d*) respectively show cases in which the resource level is respectively 1, 2, 4, and 8. For how the transmit end sends a signal and how the receive end detects the signal, refer to the foregoing description, and details are not described herein again.

It should be further understood that the second message and the first message that is delivered by the base station may be a same message, which is not limited in this embodiment of the present invention. That is, by receiving the first message delivered by the base station, the second UE may not only learn the first time-frequency resource set allocated by the base station to the first user cluster to which the second UE belongs, and the second UE may also learn a rule for detecting a signal on the first time-frequency resource set, for example, detecting the signal according to a resource level.

When the second UE does not receive specific data that is delivered by the base station and used to indicate a resource level used when the transmit end (the first UE) transmits the signal, the second UE may perform blind detection on the first time-frequency resource set until the signal sent by the first UE is detected.

Optionally, as an embodiment, that the second UE detects, according to the first time-frequency resource set, a signal sent by a first UE in S320 includes that:

the second UE successively performs blind detection on the $(1+P\times k)^{th}$ to the $(P\times(k+1))^{th}$ PRBs of the first time-frequency resource set until the signal is detected, where a value of k is 0, 1, . . . , L separately, and L is equal to a difference obtained by subtracting 1 from an integer part of (Q/P), where a value of P is 1, 2, . . . , V separately, V is a difference obtained by subtracting 1 from Q, and Q is a quantity of PRBs included in the first time-frequency resource set.

Specifically, the second UE performs a corresponding blind detection process on the first time-frequency resource set. For example, blind detection with a resource level 1 is first performed, then, blind detection with a resource level 2 is performed, blind detection with a resource level 4 is detected, and finally, a blind detection process with a resource level 8 is performed until a correct signal is obtained.

The foregoing used signal sending and receiving based on the resource level may be predefined by using a system, so that the rules are known to both the transmit end and the receive end; or the rules may be delivered by the base station to the transmit end and the receive end, which is not limited in this embodiment of the present invention.

According to the method for transmitting a signal in a D2D ProSe in this embodiment of the present invention, a resource level is used to send a signal and receive the signal, which can effectively reduce complexity of receiving the signal.

Therefore, according to the method for transmitting a signal in a D2D ProSe in this embodiment of the present invention, a signal may be transmitted directly according to a time-frequency resource allocated by a base station, which avoids resource contention with a user equipment in another user cluster, and can effectively reduce a waiting time required for using the time-frequency resource by the user equipment; in addition, a same time-frequency resource may be shared between different user clusters that have relatively small mutual interference, which can effectively improve time-frequency resource utilization; in addition, a resource level is used to detect a signal, which can effectively reduce complexity of receiving the signal.

It should be understood that, in various embodiments of the present invention, sequence numbers of the foregoing processes do not mean execution sequences. The execution sequences of the processes should be determined according to functions and internal logic of the processes, and should not set any limitation on the implementation processes of the embodiments of the present invention.

With reference to FIG. 1 to FIG. 5, the method for transmitting a signal in a D2D ProSe according to the embodiments of the present invention is described above in detail, and with reference to FIG. 6 to FIG. 8, a base station and a user equipment according to an embodiment of the present invention are described in detail in the following.

Figure 6:
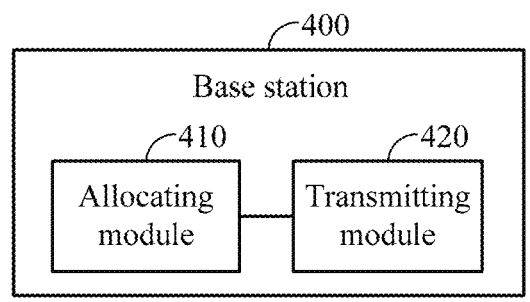
FIG. 6 shows a schematic block diagram of a base station according to an embodiment of the present invention.

FIG. 6 shows a schematic block diagram of a base station 400 according to an embodiment of the present invention. As shown in FIG. 6, the base station 400 includes:

an allocating module 410, configured to allocate at least one time-frequency resource set to each user cluster in N user clusters in a cell covered by the base station, where at least two time-frequency resource sets in M time-frequency resource sets allocated by the base station to the N user clusters are different, where N is an integer not less than 2, and M is an integer not less than N; and a transmitting module 420, configured to transmit $R^{th}$ information to the $R^{th}$ user cluster in the N user clusters, where the $R^{th}$ information is used to indicate an $R^{th}$ time-frequency resource set that is allocated by the base station to the $R^{th}$ user cluster and used for transmitting a signal, where a value of R is 1, 2, . . . , N separately.

Therefore, the base station in this embodiment of the present invention may allocate time-frequency resources that are not exactly the same to different user clusters, which can avoid time-frequency resource contention between multiple user clusters, and can effectively reduce a waiting time required for using a time-frequency resource by a user equipment, thereby effectively improving user experience satisfaction.

Optionally, as an embodiment, any two time-frequency resource sets in the M time-frequency resource sets allocated by the allocating module 410 to the N user clusters have no intersection set.

Optionally, as an embodiment, the at least one time-frequency resource set allocated by the allocating module 410 to each user cluster in the N user clusters is determined according to information about interference between the N user clusters.

Optionally, as an embodiment, the allocating module 410 includes at least one of the following:

a first allocating unit, configured to: when it is determined that interference between the $i^{th}$ user cluster and the $j^{th}$ user cluster in the N user clusters is greater than or equal to a first threshold, allocate an $i_1^{th}$ time-frequency resource set to the $i^{th}$ user cluster, and allocate a $j_1^{th}$ time-frequency resource set to the $j^{th}$ user cluster, where the $i_1^{th}$ time-frequency resource set and the $j_1^{th}$ time-frequency resource set have no intersection set; or a second allocating unit, configured to: when it is determined that interference between the $i^{th}$ user cluster and the $j^{th}$ user cluster is less than or equal to a second threshold, allocate an $i_2^{th}$ time-frequency resource set to the $i^{th}$ user cluster, and allocate a $j_2^{th}$ time-frequency resource set to the $j^{th}$ user cluster, where the $i_2^{th}$ time-frequency resource set and the $j_2^{th}$ time-frequency resource set have an intersection set; where the second threshold is not greater than the first threshold, i is any integer from 1 to N, and j is any integer, except i, from 1 to N.

Optionally, as an embodiment, the M time-frequency resource sets allocated by the allocating module 410 to the N user clusters are all physical resource block (PRB) time-frequency resource sets.

Optionally, as an embodiment, the base station further includes:

a receiving module, configured to receive a first message that is sent by a first user equipment (UE) in the $R^{th}$ user cluster and that carries a resource level of P, where the first message is used to instruct the first UE to use the $(1+P\times k)^{th}$ to the $(P\times(k+1))^{th}$ PRBs of the first time-frequency resource set to send a signal to a second UE in the $R^{th}$ user cluster, where P is a positive integer not greater than Q, a value range of k is a non-negative integer less than a rounded number of (Q/P), and Q is a quantity of PRBs included in the $R^{th}$ time-frequency resource set; and the sending module, further configured to send, according to the first message, a second message that carries the resource level of P to the second UE, so that the second UE uses the second message when detecting, on the $R^{th}$ time-frequency resource set, the signal sent by the first UE.

Optionally, as an embodiment, the sending module is further configured to: before the receiving module receives the first message, transmit third information to the $R^{th}$ user cluster, where the third information is used to instruct to use the $(1+P\times k)^{th}$ to the $(P\times(k+1))^{th}$ PRBs of the first time-frequency resource set to send the signal, where a value range of the resource level P is a positive integer not greater than Q, and a value range of k is a non-negative integer less than the rounded number of (Q/P).

Optionally, as an embodiment, the $R^{th}$ information sent by the sending module includes a correspondence between a user identifier of the $R^{th}$ user cluster and the $R^{th}$ time-frequency resource set.

It should be understood that the base station 400 according to this embodiment of the present invention may be corresponding to the base station in the methods for transmitting a signal in a D2D ProSe in the embodiments of the present invention, and the foregoing and other operations and/or functions of the modules in the base station 400 are separately used to implement corresponding procedures of the methods in FIG. 1 to FIG. 5, and for brevity, details are not described herein again.

Therefore, the base station in this embodiment of the present invention separately allocates time-frequency resources that are not exactly the same to different user clusters, which can effectively avoid resource contention between the different user clusters; in addition, the base station may allocate a same time-frequency resource or time-frequency resources that have an intersection set to different user clusters that have relatively small mutual interference, that is, a same resource may be used by two or more user clusters, which can effectively improve time-frequency resource utilization; in addition, a user equipment is instructed to use a resource level to send and receive a signal, which can effectively reduce complexity of receiving the signal.

With reference to FIG. 6, the base station according to this embodiment of the present invention is described above in detail, and with reference to FIG. 7 and FIG. 8, a user equipment according to an embodiment of the present invention is described in detail in the following.

Figure 7:
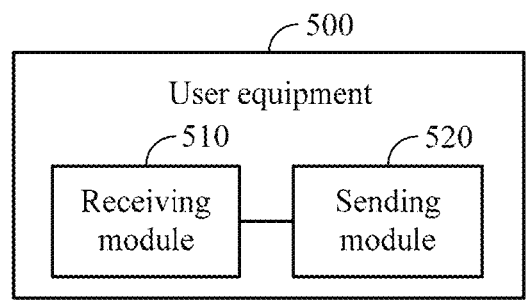
FIG. 7 shows a schematic block diagram of a user equipment according to an embodiment of the present invention.

FIG. 7 shows a schematic block diagram of a user equipment 500 according to an embodiment of the present invention. As shown in FIG. 7, the user equipment 500 includes:

a receiving module 510, configured to receive a first message sent by a base station, where the first message is used to indicate a first time-frequency resource set allocated to a first user cluster to which the user equipment (UE) 500 belongs, and the first time-frequency resource set is different from a second time-frequency resource set allocated by the base station to at least one another user cluster in a cell covered by the base station; and a sending module 520, configured to send a signal to a second UE according to the first time-frequency resource set received by the receiving module 510, where the second UE belongs to the first user cluster.

Therefore, the user equipment 500 in this embodiment of the present invention may directly transmit the signal according to a time-frequency resource allocated by the base station, which avoids resource contention with a user equipment in another user cluster, and can effectively reduce a waiting time required for using the time-frequency resource by the user equipment.

Optionally, as an embodiment, interference between the first user cluster and the at least one another user cluster is greater than or equal to a first threshold.

Optionally, as an embodiment, the first time-frequency resource set received by the receiving module 510 is a physical resource block (PRB) time-frequency resource set.

Optionally, as an embodiment, the sending module 520 is specifically configured to use the $(1+P\times k)^{th}$ to the $(P\times(k+1))^{th}$ PRBs of the first time-frequency resource set to send the signal to the second UE, where P is a resource level, the resource level P is a positive integer not greater than Q, k is a non-negative integer less than a rounded number of (Q/P), and Q is a quantity of PRBs included in the first time-frequency resource set.

Optionally, as an embodiment, the sending module 520 is further configured to send a second message that carries the resource level of P to the base station, where the second message is used to trigger the base station to send a third message that carries the resource level of P to the second UE, so that the second UE uses the third message when detecting, on the first time-frequency resource set, the signal sent by the UE.

Optionally, as an embodiment, the receiving module 510 is further configured to: before the sending module 520 sends the signal to the second UE, receive a fourth message sent by the base station, where the fourth message is used to instruct to use the $(1+P\times k)^{th}$ to the $(P\times(k+1))^{th}$ PRBs of the first time-frequency resource set to send the signal, where a value range of the resource level P is a positive integer not greater than Q, and a value range of k is a non-negative integer less than the rounded number of (Q/P).

Optionally, as an embodiment, the first message received by the receiving module 510 includes a correspondence between a user identifier of the first user cluster and the first time-frequency resource set.

The sending module 520 includes:

a determining unit, configured to determine the first time-frequency resource set according to the correspondence received by the receiving module; and a sending unit, configured to send the signal to the second UE according to the first time-frequency resource set determined by the determining unit.

It should be understood that the user equipment 500 according to this embodiment of the present invention may be corresponding to the first user equipment in the methods for transmitting a signal in a D2D ProSe in the embodiments of the present invention, and the foregoing and other operations and/or functions of the modules in the user equipment 500 are separately used to implement corresponding procedures of the methods in FIG. 1 to FIG. 5, and for brevity, details are not described herein again.

Therefore, the user equipment 500 in this embodiment of the present invention may directly transmit a signal according to a time-frequency resource allocated by a base station, which avoids resource contention with a user equipment in another user cluster, and can effectively reduce a waiting time required for using the time-frequency resource by the user equipment; in addition, a same time-frequency resource may be shared between different user clusters that have relatively small mutual interference, which can effectively improve time-frequency resource utilization; in addition, a resource level is used to send a signal, which can effectively reduce complexity of receiving the signal.

With reference to FIG. 7, the user equipment 500 according to this embodiment of the present invention is described above in detail, and with reference to FIG. 8, another user equipment according to an embodiment of the present invention is described in detail in the following.

Figure 8:
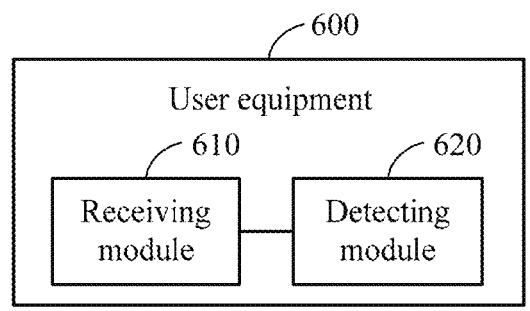
FIG. 8 shows a schematic block diagram of another user equipment according to an embodiment of the present invention.

FIG. 8 shows a schematic block diagram of a user equipment 600 according to an embodiment of the present invention, where the user equipment 600 includes:

a receiving module 610, configured to receive a first message sent by a base station, where the first message is used to indicate a first time-frequency resource set allocated to a first user cluster to which the user equipment (UE) 600 belongs, and the first time-frequency resource set has no intersection set with a second time-frequency resource set allocated by the base station to at least one another user cluster in a cell covered by the base station; and a detecting module 620, configured to detect, according to the first time-frequency resource set received by the receiving module 610, a signal sent by a first UE, where the first UE belongs to the first user cluster.

Therefore, the user equipment 600 in this embodiment of the present invention may directly transmit the signal according to a time-frequency resource allocated by the base station, which avoids resource contention with a user equipment in another user cluster, and can effectively reduce a waiting time required for using the time-frequency resource by the user equipment.

Optionally, as an embodiment, interference between the first user cluster and the at least one another user cluster is greater than or equal to a first threshold.

Optionally, as an embodiment, the first time-frequency resource set received by the receiving module 610 is a physical resource block (PRB) time-frequency resource set.

Optionally, as an embodiment, the receiving module 610 is further configured to receive a second message sent by the base station, where the second message is used to instruct to detect the signal on the $(1+P\times k)^{th}$ to the $(P\times(k+1))^{th}$ PRBs of the first time-frequency resource set, where P is a resource level, the resource level P is a positive integer not greater than Q, a value range of k is a non-negative integer less than a rounded number of (Q/P), and Q is a quantity of PRBs included in the first time-frequency resource set; and the detecting module 620 is specifically configured to successively perform, according to the second message, blind detection on the $(1+P\times k)^{th}$ to the $(P\times(k+1))^{th}$ PRBs of the first time-frequency resource set until the signal is detected, where a value of k is 0, 1, . . . , L separately, and L is a difference obtained by subtracting 1 from an integer part of (Q/P).

Optionally, as an embodiment, the detecting module 620 is specifically configured to successively perform blind detection on the $(1+P\times k)^{th}$ to the $(P\times(k+1))^{th}$ PRBs of the first time-frequency resource set until the signal is detected, where a value of k is 0, 1, . . . , L separately, and L is equal to a difference obtained by subtracting 1 from an integer part of (Q/P), where a value of P is 1, 2, . . . , V separately, V is a difference obtained by subtracting 1 from Q, and Q is a quantity of PRBs included in the first time-frequency resource set.

Optionally, as an embodiment, the first message received by the receiving module 610 includes a correspondence between a user identifier of the first user cluster and the first time-frequency resource set, where the detecting module 620 includes:

a determining unit, configured to determine the first time-frequency resource set according to the correspondence; and a detecting unit, configured to detect, according to the first time-frequency resource set, the signal sent by the first UE.

It should be understood that the user equipment 600 according to this embodiment of the present invention may be corresponding to the second user equipment in the methods for transmitting a signal in a D2D ProSe in the embodiments of the present invention, and the foregoing and other operations and/or functions of the modules in the user equipment 600 are separately used to implement corresponding procedures of the methods in FIG. 1 to FIG. 5, and for brevity, details are not described herein again.

Therefore, the user equipment 600 in this embodiment of the present invention may directly transmit a signal according to a time-frequency resource allocated by a base station, which avoids resource contention with a user equipment in another user cluster, and can effectively reduce a waiting time required for using the time-frequency resource by the user equipment; in addition, a same time-frequency resource may be shared between different user clusters that have relatively small mutual interference, which can effectively improve time-frequency resource utilization; in addition, a resource level is used to detect the signal, which can effectively reduce complexity of receiving the signal.

Figure 9:
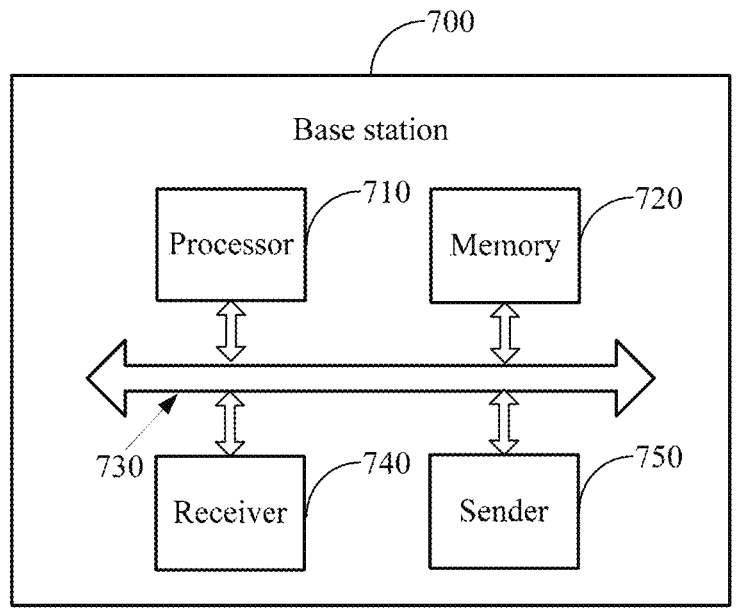
FIG. 9 shows a schematic block diagram of a base station according to another embodiment of the present invention.

As shown in FIG. 9, an embodiment of the present invention further provides a base station 700, where the base station 700 includes a processor 710, a memory 720, a bus system 730, a receiver 740, and a sender 750. The processor 710, the memory 720, the receiver 740, and the sender 750 are connected by using the bus system 730. The memory 720 is configured to store an instruction, and the processor 710 is configured to execute the instruction stored in the memory 720, so as to control the receiver 740 to receive a signal and control the sender 750 to send the signal. The processor 710 is configured to allocate at least one time-frequency resource set to each user cluster in N user clusters in a cell covered by the base station 700, where at least two time-frequency resource sets in M time-frequency resource sets allocated by the base station 700 to the N user clusters are different, where N is an integer not less than 2, and M is an integer not less than N; and the sender 750 is configured to transmit $R^{th}$ information to the $R^{th}$ user cluster in the N user clusters, where the $R^{th}$ information is used to indicate an $R^{th}$ time-frequency resource set that is allocated by the base station to the $R^{th}$ user cluster and used for transmitting the signal, where a value of R is 1, 2, . . . , N separately.

Therefore, the base station in this embodiment of the present invention may allocate time-frequency resources that are not exactly the same to different user clusters, which can avoid time-frequency resource contention between multiple user clusters, and can effectively reduce a waiting time required for using a time-frequency resource by a user equipment, thereby effectively improving user experience satisfaction.

Optionally, as an embodiment, any two time-frequency resource sets in the M time-frequency resource sets allocated by the processor 710 to the N user clusters have no intersection set.

Optionally, as an embodiment, the at least one time-frequency resource set allocated by the processor 710 to each user cluster in the N user clusters is determined according to information about interference between the N user clusters.

Optionally, as an embodiment, the processor 710 is specifically configured to:

when it is determined that interference between the $i^{th}$ user cluster and the $j^{th}$ user cluster in the N user clusters is greater than or equal to a first threshold, allocate an time-frequency resource set to the $i^{th}$ user cluster, and allocate a $j_1^{th}$ time-frequency resource set to the $j^{th}$ user cluster, where the $i_1^{th}$ time-frequency resource set and the j time-frequency resource set have no intersection set; or when it is determined that interference between the $i^{th}$ user cluster and the $j^{th}$ user cluster is less than or equal to a second threshold, allocate an $i_2^{th}$ time-frequency resource set to the $i^{th}$ user cluster, and allocate a $j_2^{th}$ time-frequency resource set to the $j^{th}$ user cluster, where the $i_2^{th}$ time-frequency resource set and the $j_2^{th}$ time-frequency resource set have an intersection set; where the second threshold is not greater than the first threshold, i is any integer from 1 to N, and j is any integer, except i, from 1 to N.

Optionally, as an embodiment, the M time-frequency resource sets allocated by the processor 710 to the N user clusters are all physical resource block (PRB) time-frequency resource sets.

Optionally, as an embodiment, the receiver 740 is configured to receive a first message that is sent by a first user equipment (UE) in the $R^{th}$ user cluster and that carries a resource level of P, where the first message is used to instruct the first UE to use the $(1+P\times k)^{th}$ to the $(P\times(k+1))^{th}$ PRBs of the first time-frequency resource set to send a signal to a second UE in the $R^{th}$ user cluster, where P is a positive integer not greater than Q, a value range of k is a non-negative integer less than a rounded number of (Q/P), and Q is a quantity of PRBs included in the $R^{th}$ time-frequency resource set; and the sender 750 is further configured to send, according to the first message, a second message that carries the resource level of P to the second UE, so that the second UE uses the second message when detecting, on the $R^{th}$ time-frequency resource set, the signal sent by the first UE.

Optionally, as an embodiment, the sender 750 is further configured to: before the receiver 740 receives the third indication information, transmit third information to the $R^{th}$ user cluster, where the third information is used to instruct to use the $(1+P\times k)^{th}$ to the $(P\times(k+1))^{th}$ PRBs of the first time-frequency resource set to send the signal, where a value range of the resource level P is a positive integer not greater than Q, and a value range of k is a non-negative integer less than the rounded number of (Q/P).

Optionally, as an embodiment, the $R^{th}$ information sent by the sender 750 includes a correspondence between a user identifier of the $R^{th}$ user cluster and the $R^{th}$ time-frequency resource set.

It should be understood that, in this embodiment of the present invention, the processor 710 may be a central processing unit (English full name: Central Processing Unit, English abbreviations: CPU), and the processor 710 may also be another general purpose processor, a digital signal processor (DSP), an application-specific integrated circuit (ASIC), a field programmable gate array (FPGA) or another programmable logical device, a discrete gate or transistor logic device, a discrete hardware assembly, or the like. The general purpose processor may be a microprocessor or the processor may be any conventional processor, or the like.

The memory 720 may include a read-only memory and a random access memory, and provides an instruction and data for the processor 710. A part of the memory 720 may further include a nonvolatile random access memory. For example, the memory 720 may further store information about a device type.

The bus system 730 may further include a power bus, a control bus, a status signal bus, and the like, in addition to a data bus. However, for clarity of description, various buses in the figure are marked as the bus system 730.

In an implementation process, the steps in the foregoing methods may be completed by using an integrated logic circuit of hardware in the processor 710 or an instruction in a form of software. Steps of the methods disclosed with reference to the embodiments of the present invention may be directly executed and completed by a hardware processor, or may be executed and completed by using a combination of hardware and software modules in the processor. The software module may be located in a mature storage medium in the art, such as a random access memory, a flash memory, a read-only memory, a programmable read-only memory, an electrically erasable programmable read-only memory or a register. The storage medium is located in the memory 720. The processor 710 reads information from the memory 720, and completes the steps of the foregoing methods in combination with the hardware of the processor 710. To avoid repetition, details are not described herein again.

It should be further understood that the base station 700 according to this embodiment of the present invention may be corresponding to the base station in the methods for transmitting a signal in a D2D ProSe in the embodiments of the present invention. or may be corresponding to the base station 400 in the embodiments of the present invention, and the foregoing and other operations and/or functions of the modules in the base station 700 are separately used to implement corresponding procedures of the methods in FIG. 1 to FIG. 5, and for brevity, details are not described herein again.

Therefore, the base station 700 in this embodiment of the present invention may separately allocates time-frequency resources that are not exactly the same to different user clusters, which can effectively avoid resource contention between the different user clusters; in addition, the base station may allocate a same time-frequency resource or time-frequency resources that have an intersection set to different user clusters that have relatively small mutual interference, that is, a same resource may be used by two or more user clusters, which can effectively improve time-frequency resource utilization; in addition, a user equipment is instructed to use a resource level to send and receive a signal, which can effectively reduce complexity of receiving the signal.

Figure 10:
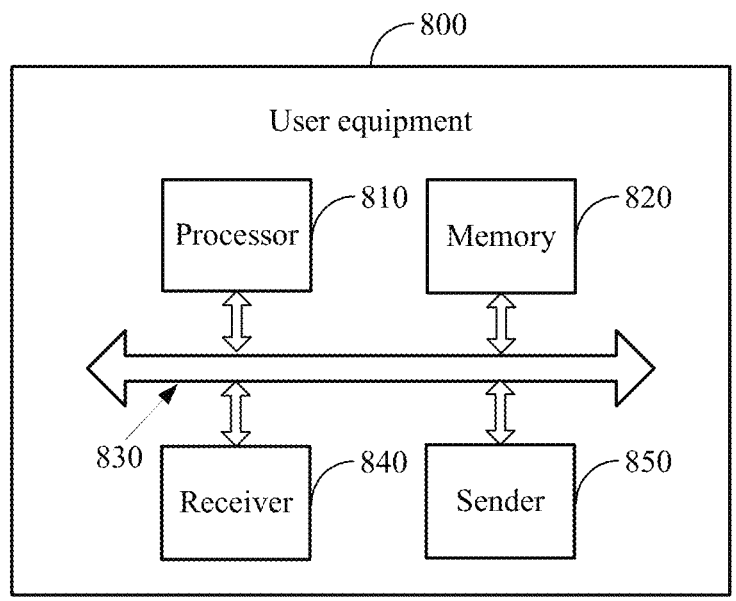
FIG. 10 shows a schematic block diagram of a user equipment according to another embodiment of the present invention.

As shown in FIG. 10, an embodiment of the present invention further provides a user equipment 800, where the user equipment 800 includes a processor 810, a memory 820, a bus system 830, a receiver 840, and a sender 850. The processor 810, the memory 820, the receiver 840, and the sender 850 are connected by using the bus system 830. The memory 820 is configured to store an instruction, and the processor 810 is configured to execute the instruction stored in the memory 820, so as to control the receiver 840 to receive a signal and control the sender 850 to send the signal. The receiver 840 is configured to receive a first message sent by a base station, where the first message is used to indicate a first time-frequency resource set allocated to a first user cluster to which the user equipment (UE) 800 belongs, and the first time-frequency resource set is different from a second time-frequency resource set allocated by the base station to at least one another user cluster in a cell covered by the base station; the sender 850 is configured to send the signal to a second UE according to the first time-frequency resource set received by the receiver 840, where the second UE belongs to the first user cluster.

Therefore, the user equipment 800 in this embodiment of the present invention may directly transmit a signal according to a time-frequency resource allocated by the base station, which avoids resource contention with a user equipment in another user cluster, and can effectively reduce a waiting time required for using the time-frequency resource by the user equipment.

Optionally, as an embodiment, interference between the first user cluster and the at least one another user cluster is greater than or equal to a first threshold.

Optionally, as an embodiment, the first time-frequency resource set received by the receiver 840 is a physical resource block (PRB) time-frequency resource set.

Optionally, as an embodiment, the sender 850 is specifically configured to use the $(1+P \times k)^{th}$ to the $(P \times (k+1))^{th}$ PRBs of the first time-frequency resource set to send the signal to the second UE, where P is a resource level and is a positive integer not greater than Q, k is a non-negative integer less than a rounded number of (Q/P), and Q is a quantity of PRBs included in the first time-frequency resource set.

Optionally, as an embodiment, the sender 850 is further configured to send a second message that carries the resource level of P to the base station, where the second message is used to trigger the base station to send a third message that carries the resource level of P to the second UE, so that the second UE uses the third message when detecting, on the first time-frequency resource set, the signal sent by the first UE.

Optionally, as an embodiment, the receiver 840 is further configured to: before the sender 850 sends the signal to the second UE, receive a fourth message sent by the base station, where the fourth message is used to instruct to use the $(1+P \times k)^{th}$ to the $(P \times (k+1))^{th}$ PRBs of the first time-frequency resource set to send the signal, where a value range of the resource level P is a positive integer not greater than Q, and a value range of k is a non-negative integer less than the rounded number of (Q/P).

Optionally, as an embodiment, the first message received by the receiver 840 includes a correspondence between a user identifier of the first user cluster and the first time-frequency resource set; where the processor 810 is configured to determine the first time-frequency resource set according to the correspondence received by the receiver 840; and the sender 850 is configured to send the signal to the second UE according to the first time-frequency resource set determined by the processor 810.

It should be understood that, in this embodiment of the present invention, the processor 810 may be a central processing unit (English full name: Central Processing Unit, English abbreviations: CPU), and the processor 810 may also be another general purpose processor, a digital signal processor (DSP), an application-specific integrated circuit (ASIC), a field programmable gate array (FPGA) or another programmable logical device, a discrete gate or transistor logic device, a discrete hardware assembly, or the like. The general purpose processor may be a microprocessor or the processor may be any conventional processor, or the like.

The memory 820 may include a read-only memory and a random access memory, and provides an instruction and data for the processor 810. A part of the memory 820 may further include a nonvolatile random access memory. For example, the memory 820 may further store information about a device type.

The bus system 830 may further include a power bus, a control bus, a status signal bus, and the like, in addition to a data bus. However, for clarity of description, various buses in the figure are marked as the bus system 830.

In an implementation process, the steps in the foregoing methods may be completed by using an integrated logic circuit of hardware in the processor 810 or an instruction in a form of software. Steps of the methods disclosed with reference to the embodiments of the present invention may be directly executed and completed by a hardware processor, or may be executed and completed by using a combination of hardware and software modules in the processor. The software module may be located in a mature storage medium in the art, such as a random access memory, a flash memory, a read-only memory, a programmable read-only memory, an electrically erasable programmable read-only memory or a register. The storage medium is located in the memory 820. The processor 810 reads information from the memory 820, and completes the steps of the foregoing methods in combination with the hardware of the processor 810. To avoid repetition, details are not described herein again.

It should be further understood that the user equipment 800 according to this embodiment of the present invention may be corresponding to the first user equipment in the methods for transmitting a signal in a D2D ProSe in the embodiments of the present invention, or may be corresponding to the user equipment 500 in the embodiments of the present invention, and the foregoing and other operations and/or functions of the modules in the user equipment 800 are separately used to implement corresponding procedures of the methods in FIG. 1 to FIG. 5, and for brevity, details are not described herein again.

Therefore, the user equipment 800 in this embodiment of the present invention may directly transmit a signal according to a time-frequency resource allocated by a base station, which avoids resource contention with a user equipment in another user cluster, and can effectively reduce a waiting time required for using the time-frequency resource by the user equipment; in addition, a same time-frequency resource may be shared between different user clusters that have relatively small mutual interference, which can effectively improve time-frequency resource utilization; in addition, a resource level is used to send the signal, which can effectively reduce complexity of receiving the signal.

Figure 11:
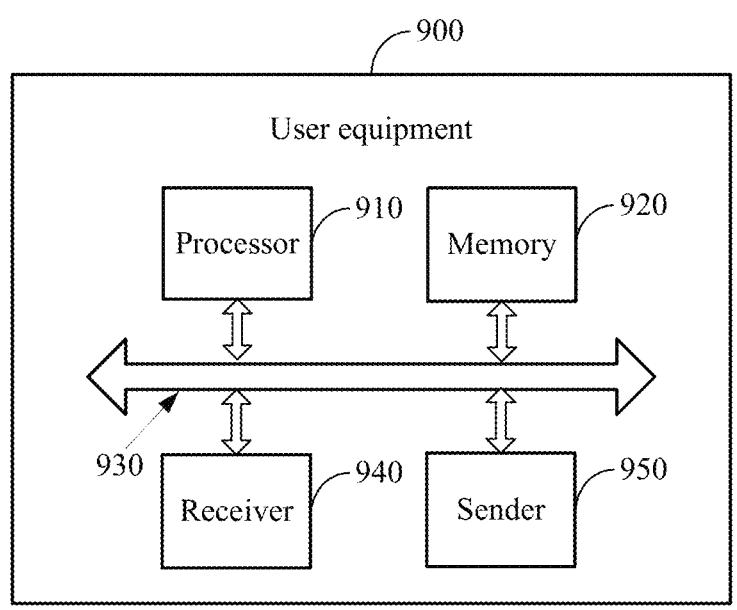
FIG. 11 shows a schematic block diagram of another user equipment according to another embodiment of the present invention.

As shown in FIG. 11, an embodiment of the present invention further provides another user equipment 900, where the user equipment 900 includes a processor 910, a memory 920, a bus system 930, a receiver 940, and a sender 950. The processor 910, the memory 920, the receiver 940, and the sender 950 are connected by using the bus system 930. The memory 920 is configured to store an instruction, and the processor 910 is configured to execute the instruction stored in the memory 920, so as to control the receiver 940 to receive a signal and control the sender 950 to send the signal. The receiver 940 is configured to receive a first message sent by a base station, where the first message is used to indicate a first time-frequency resource set allocated to a first user cluster to which the user equipment (UE) 900 belongs, and the first time-frequency resource set is different from a second time-frequency resource set allocated by the base station to at least one another user cluster in a cell covered by the base station; and the processor 910 is configured to detect, according to the first time-frequency resource set received by the receiver 940, a signal sent by a first UE, where the first UE belongs to the first user cluster.

Therefore, the user equipment 900 in this embodiment of the present invention may directly transmit a signal according to a time-frequency resource allocated by the base station, which avoids resource contention with a user equipment in another user cluster, and can effectively reduce a waiting time required for using the time-frequency resource by the user equipment.

Optionally, as an embodiment, interference between the first user cluster and the at least one another user cluster is greater than or equal to a first threshold.

Optionally, as an embodiment, the first time-frequency resource set received by the receiver 940 is a physical resource block (PRB) time-frequency resource set.

Optionally, as an embodiment, the receiver 940 is further configured to receive a second message sent by the base station, where the second message is used to instruct to detect the signal on the $(1+P \times k)^{th}$ to the $(P \times (k+1))^{th}$ PRBs of the first time-frequency resource set, where P is a resource level, the resource level P is a positive integer not greater than Q, a value range of k is a non-negative integer less than a rounded number of (Q/P), and Q is a quantity of PRBs included in the first time-frequency resource set; and the processor 910 is specifically configured to successively perform, according to the second message, blind detection on the $(1+P \times k)^{th}$ to the $(P \times (k+1))^{th}$ PRBs of the first time-frequency resource set until the signal is detected, where a value of k is 0, 1, . . . , L separately, and L is a difference obtained by subtracting 1 from an integer part of (Q/P).

Optionally, as an embodiment, the processor 910 is specifically configured to successively perform blind detection on the $(1+P \times k)^{th}$ to the $(P \times (k+1))^{th}$ PRBs of the first time-frequency resource set until the signal is detected, where a value of k is set to 0, 1, . . . , and L respectively, and L is equal to a difference obtained by subtracting 1 from an integer part of (Q/P), where a value of P is set to 1, 2, . . . , V separately, V is a difference obtained by subtracting 1 from Q, and Q is a quantity of PRBs included in the first time-frequency resource set.

Optionally, as an embodiment, the first message received by the receiver 940 includes a correspondence between a user identifier of the first user cluster and the first time-frequency resource set; where the processor 910 is specifically configured to determine the first time-frequency resource set according to the correspondence; and detect, according to the first time-frequency resource set, the signal sent by the first UE.

It should be understood that, in this embodiment of the present invention, the processor 910 may be a central processing unit (English full name: Central Processing Unit, English abbreviations: CPU), and the processor 910 may also be another general purpose processor, a digital signal processor (DSP), an application-specific integrated circuit (ASIC), a field programmable gate array (FPGA) or another programmable logical device, a discrete gate or transistor logic device, a discrete hardware assembly, or the like. The general purpose processor may be a microprocessor or the processor may be any conventional processor, or the like.

The memory 920 may include a read-only memory and a random access memory, and provides an instruction and data for the processor 910. A part of the memory 920 may further include a nonvolatile random access memory. For example, the memory 920 may further store information about a device type.

The bus system 930 may further include a power bus, a control bus, a status signal bus, and the like, in addition to a data bus. However, for clarity of description, various buses in the figure are marked as the bus system 930.

In an implementation process, the steps in the foregoing methods may be completed by using an integrated logic circuit of hardware in the processor 910 or an instruction in a form of software. Steps of the methods disclosed with reference to the embodiments of the present invention may be directly executed and completed by a hardware processor, or may be executed and completed by using a combination of hardware and software modules in the processor. The software module may be located in a mature storage medium in the art, such as a random access memory, a flash memory, a read-only memory, a programmable read-only memory, an electrically erasable programmable read-only memory or a register. The storage medium is located in the memory 920. The processor 910 reads information from the memory 920, and completes the steps of the foregoing methods in combination with the hardware of the processor 910. To avoid repetition, details are not described herein again.

It should be understood that the user equipment 900 according to this embodiment of the present invention may be corresponding to the second user equipment in the methods for transmitting a signal in a D2D ProSe in the embodiments of the present invention, or may be corresponding to the user equipment 600 in the embodiments of the present invention, and the foregoing and other operations and/or functions of the modules in the user equipment 900 each are used to implement corresponding procedures of the methods in FIG. 1 to FIG. 5, and for brevity, details are not described herein again.

Therefore, the user equipment 900 in this embodiment of the present invention may directly transmit a signal according to a time-frequency resource allocated by a base station, which avoids resource contention with a user equipment in another user cluster, and can effectively reduce a waiting time required for using the time-frequency resource by the user equipment; in addition, a same time-frequency resource may be shared between different user clusters that have relatively small mutual interference, which can effectively improve time-frequency resource utilization; in addition, a resource level is used to detect the signal, which can effectively reduce complexity of receiving the signal.

It should be understood that the "first user equipment" and the "second user equipment" mentioned in the specification are merely used for differentiating two user equipments, and the "first user equipment" and the "second user equipment" may be used as transmit ends or may be used as receive ends. The "first" in the "first user equipment" and the "second" in the "second user equipment" have no special meaning and are merely used for differentiation.

The term "and/or" in this specification describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not set any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting a signal in a device-to-device proximity service, comprising:
    allocating, by a base station, at least one time-frequency resource set to each user cluster in N user clusters in a cell covered by the base station, wherein at least two time-frequency resource sets in M time-frequency resource sets allocated by the base station to the N user clusters are different from each other, wherein N is an integer not less than 2, and M is an integer not less than N; and
    transmitting, by the base station, $R^{th}$ information to the $R^{th}$ user cluster in the N user clusters, wherein the $R^{th}$ information is used to indicate an $R^{th}$ time-frequency resource set that is allocated by the base station to the $R^{th}$ user cluster and used for transmitting a signal, wherein a value of R is 1, 2, . . . , N separately,
    wherein the allocating at least one time-frequency resource set to each user cluster in N user clusters in a cell covered by the base station comprises allocating, by the base station, the at least one time-frequency resource set to each user cluster in the N user clusters according to information about interference between the N user clusters, and
    wherein the allocating the at least one time-frequency resource set to each user cluster in the N user clusters according to information about interference between the N user clusters comprises:
        when it is determined that interference between the $i^{th}$ user cluster and the $j^{th}$ user cluster in the N user clusters is greater than or equal to a first threshold, allocating an $i_1^{th}$ time-frequency resource set to the $i^{th}$ user cluster, and allocating a $j_1^{th}$ time-frequency resource set to the $j^{th}$ user cluster, wherein the $i_1^{th}$ time-frequency resource set and the $j_1^{th}$ time-frequency resource set have no intersection set;
        when it is determined that interference between the $i^{th}$ user cluster and the $j^{th}$ user cluster is less than or equal to a second threshold, allocating an $i_2^{th}$ time-frequency resource set to the $i^{th}$ user cluster, and allocating a $j_2^{th}$ time-frequency resource set to the $j^{th}$ user cluster, wherein the $i_2^{th}$ time-frequency resource set and the $j_2^{th}$ time-frequency resource set have an intersection set;
        wherein the second threshold is not greater than the first threshold, i is any integer from 1 to N, and j is any integer, except i, from 1 to N.

2. The method according to claim 1, wherein any two time-frequency resource sets in the M time-frequency resource sets have no intersection set.

3. The method according to claim 1, wherein the $R^{th}$ information comprises a correspondence between a user identifier of the $R^{th}$ user cluster and the $R^{th}$ time-frequency resource set.

4. A method for transmitting a signal in a device-to-device proximity service, comprising:
    allocating, by a base station, at least one time-frequency resource set to each user cluster in N user clusters in a cell covered by the base station, wherein at least two time-frequency resource sets in M time-frequency resource sets allocated by the base station to the N user clusters are different from each other, wherein N is an integer not less than 2, and M is an integer not less than N; and
    transmitting, by the base station, $R^{th}$ information to the $R^{th}$ user cluster in the N user clusters, wherein the $R^{th}$ information is used to indicate an $R^{th}$ time-frequency resource set that is allocated by the base station to the $R^{th}$ user cluster and used for transmitting a signal, wherein a value of R is 1, 2, . . . , N separately,
    wherein the M time-frequency resource sets are all physical resource block time-frequency resource sets,
    wherein the method further comprises:
        receiving, by the base station, a first message that is sent by a first user equipment in the $R^{th}$ user cluster and that carries a resource level of P, wherein the first message is used to indicate that the first user equipment uses the $(1+P \times k)^{th}$ to the $(P \times (k+1))^{th}$ physical resource blocks of the $R^{th}$ time-frequency resource set to send a signal to a second user equipment in the $R^{th}$ user cluster, wherein P is a positive integer not greater than Q, a value range of k is a non-negative integer less than a rounded number of (Q/P), and Q is a quantity of physical resource blocks comprised in the $R^{th}$ time-frequency resource set; and
        sending, by the base station according to the first message, a second message that carries the resource level of P to the second user equipment, so that the second user equipment uses the second message when detecting, on the $R^{th}$ time-frequency resource set, the signal sent by the first user equipment.

5. A base station comprising:
    a processor, and
    a non-transitory computer-readable memory including computer-executable instructions that are executable by the processor to carry out a method comprising:
        allocating at least one time-frequency resource set to each user cluster in N user clusters in a cell covered by the base station, wherein at least two time-frequency resource sets in M time-frequency resource sets allocated by the base station to the N user clusters are different from each other, wherein N is an integer not less than 2, and M is an integer not less than N; and
        transmitting $R^{th}$ information to the $R^{th}$ user cluster in the N user clusters, wherein the $R^{th}$ information is used to indicate an $R^{th}$ time-frequency resource set that is allocated by the base station to the $R^{th}$ user cluster and used for transmitting a signal, wherein a value of R is 1, 2, . . . , N separately, wherein the allocating at least one time-frequency resource set to each user cluster in N user clusters in a cell covered by the base station comprises allocating, by the base station, the at least one time-frequency resource set to each user cluster in the N user clusters according to information about interference between the N user clusters, and wherein the allocating the at least one time-frequency resource set to each user cluster in the N user clusters according to information about interference between the N user clusters comprises:

when it is determined that interference between the $i^{th}$ user cluster and the $j^{th}$ user cluster in the N user clusters is greater than or equal to a first threshold, allocating an $i_1^{th}$ time-frequency resource set to the $i^{th}$ user cluster, and allocating a $j_1^{th}$ time-frequency resource set to the $j^{th}$ user cluster, wherein the $i_1^{th}$ time-frequency resource set and the $j_1^{th}$ time-frequency resource set have no intersection set;

when it is determined that interference between the $i^{th}$ user cluster and the $j^{th}$ user cluster is less than or equal to a second threshold, allocating an $i_2^{th}$ time-frequency resource set to the $i^{th}$ user cluster, and allocating a $j_2^{th}$ time-frequency resource set to the $j^{th}$ user cluster, wherein the $i_2^{th}$ time-frequency resource set and the $j_2^{th}$ time-frequency resource set have an intersection set;

wherein the second threshold is not greater than the first threshold, i is any integer from 1 to N, and j is any integer, except i, from 1 to N.

6. The base station according to claim 5, wherein any two time-frequency resource sets in the M time-frequency resource sets allocated by the processor to the N user clusters have no intersection set.

7. The base station according to claim 5, wherein the $R^{th}$ information transmitted by the sender comprises a correspondence between a user identifier of the $R^{th}$ user cluster and the $R^{th}$ time-frequency resource set.

8. A base station comprising:

a processor, and a non-transitory computer-readable memory including computer-executable instructions that are executable by the processor to carry out a method comprising:

allocating at least one time-frequency resource set to each user cluster in N user clusters in a cell covered by the base station, wherein at least two time-frequency resource sets in M time-frequency resource sets allocated by the base station to the N user clusters are different from each other, wherein N is an integer not less than 2, and M is an integer not less than N; and transmitting $R^{th}$ information to the $R^{th}$ user cluster in the N user clusters, wherein the $R^{th}$ information is used to indicate an $R^{th}$ time-frequency resource set that is allocated by the base station to the $R^{th}$ user cluster and used for transmitting a signal, wherein a value of R is 1, 2, . . . , N separately, wherein the M time-frequency resource sets are all physical resource block time-frequency resource sets, wherein the method further comprises:

receiving a first message that is sent by a first user equipment in the $R^{th}$ user cluster and that carries a resource level of P, wherein the first message is used to indicate that the first user equipment uses the $(1+P\times k)^{th}$ to the $(P\times(k+1))^{th}$ physical resource blocks of the $R^{th}$ time-frequency resource set to send a signal to a second user equipment in the $R^{th}$ user cluster, wherein P is a positive integer not greater than Q, a value range of k is a non-negative integer less than a rounded number of (Q/P), and Q is a quantity of physical resource blocks comprised in the $R^{th}$ time-frequency resource set; and sending, according to the first message, a second message that carries the resource level of P to the second user equipment, so that the second user equipment uses the second message when detecting, on the $R^{th}$ time-frequency resource set, the signal sent by the first user equipment.

* * * * *